US012379306B2

(12) United States Patent
Dickson et al.

(10) Patent No.: US 12,379,306 B2
(45) Date of Patent: Aug. 5, 2025

(54) SURFACE PERFORMANCE TESTING APPARATUS, SYSTEMS AND METHODS

(71) Applicant: Stadium Grow Lighting B.V., Waddinxveen (NL)

(72) Inventors: Kyley Hampton Dickson, Knoxville, TN (US); John Charles Sorochan, Knoxville, TN (US)

(73) Assignee: STADIUM GROW LIGHTING B.V., Waddinxveen (NL)

( * ) Notice: Subject to any disclaimer, the term of this patent is extended or adjusted under 35 U.S.C. 154(b) by 444 days.

(21) Appl. No.: 17/409,362

(22) Filed: Aug. 23, 2021

(65) Prior Publication Data

US 2021/0381951 A1 Dec. 9, 2021

Related U.S. Application Data

(63) Continuation-in-part of application No. PCT/US2020/067465, filed on Dec. 30, 2020.
(Continued)

(51) Int. Cl.
*G01N 19/02* (2006.01)
*A43D 1/08* (2006.01)
(Continued)

(52) U.S. Cl.
CPC ............. *G01N 19/02* (2013.01); *A43D 1/08* (2013.01); *G01L 5/0052* (2013.01); *G01N 3/02* (2013.01); *G01N 3/30* (2013.01)

(58) Field of Classification Search
CPC ............ A43D 1/08; G01N 19/02; G01N 3/02; G01N 3/30; G01L 5/0052
See application file for complete search history.

(56) References Cited

U.S. PATENT DOCUMENTS 4,432,223 A * 2/1984 Paquette .................. G01N 3/56
  73/73
4,759,209 A * 7/1988 Brungraber ............ G01N 19/02
  73/9
(Continued)

FOREIGN PATENT DOCUMENTS

AU  2004270767 B2 * 5/2007 ............ G01N 19/02
AU  2020432698 A1    10/2022
(Continued)

OTHER PUBLICATIONS

Thomson et al, Six different football shoes, one playing surface and the weather; Assessing variation in shoe-surface traction over one season of elite football, PLOS One, Apr. 30, 2019 (Year: 2019).*
(Continued)

*Primary Examiner* — David L Singer
(74) *Attorney, Agent, or Firm* — KDW Firm PLLC

(57) ABSTRACT

A system to study various forces acting on an athletic field or an athletic surface caused by the interaction between a shoe and the turf or athletic surface during a simulated impact includes a cart slidably affixed to a rail, an actuator linked to the cart, and a footform affixed to the cart. The footform is configured to mimic a human foot, animal hoof or animal foot. The cart, rail and actuator are arranged to move the cart and attached footform at an angle relative to a substantially horizontal surface to be tested, whereby the footform contacts the surface to be tested at a selected contact angle.

14 Claims, 26 Drawing Sheets

Related U.S. Application Data

(60) Provisional application No. 62/981,843, filed on Feb. 26, 2020.

(51) Int. Cl.
*G01L 5/00* (2006.01)
*G01N 3/02* (2006.01)
*G01N 3/30* (2006.01)

(56) References Cited

U.S. PATENT DOCUMENTS

| | | | | |
|---|---|---|---|---|
| 5,259,236 | A | * | 11/1993 | English ................ G01N 19/02 73/9 |
| 6,038,935 | A | | 3/2000 | Fullen et al. |
| 9,464,980 | B2 | | 10/2016 | Yngve |
| 2004/0149005 | A1 | * | 8/2004 | Hage .................... G01N 19/02 73/9 |
| 2006/0130556 | A1 | * | 6/2006 | Olde Weghuis ....... G01N 19/02 73/9 |
| 2008/0000285 | A1 | | 1/2008 | Gregory et al. |
| 2009/0320556 | A1 | * | 12/2009 | Collins ................. G01N 19/02 73/9 |
| 2012/0240660 | A1 | * | 9/2012 | Johnson ........... G01N 35/00693 73/9 |
| 2012/0297889 | A1 | * | 11/2012 | Yngve ................... A43D 1/08 73/818 |
| 2013/0055797 | A1 | | 3/2013 | Cline et al. |
| 2019/0302003 | A1 | | 10/2019 | Sick et al. |
| 2019/0369005 | A1 | | 12/2019 | Gray |
| 2020/0033253 | A1 | | 1/2020 | Souyri et al. |
| 2023/0141452 | A1 | | 5/2023 | Dickson et al. |
| 2024/0353312 | A1 | | 10/2024 | Dickson et al. |

FOREIGN PATENT DOCUMENTS

| | | | | | |
|---|---|---|---|---|---|
| CN | 2410635 | Y | * | 12/2000 | ............ G01N 19/02 |
| CN | 201611332 | U | | 10/2010 | |
| CN | 201622235 | U | * | 11/2010 | ............ G01N 19/02 |
| CN | 106568707 | A | * | 4/2017 | ............ G01N 19/02 |
| CN | 108497624 | A | * | 9/2018 | ............... A43D 1/08 |
| CN | 209296508 | U | | 8/2019 | |
| EP | 3141886 | A1 | * | 3/2017 | ............ G01N 19/02 |
| FR | 2751748 | A1 | * | 1/1998 | ............ G01N 19/02 |
| FR | 3038721 | A1 | * | 1/2017 | ............ G01N 19/02 |
| WO | WO2021/173226 | A1 | | 9/2021 | |
| WO | WO2023/028068 | A1 | | 3/2023 | |

OTHER PUBLICATIONS

International Search Report and Written Opinion of the International Searching Authority corresponding to International Patent Application No. PCT/US2020/067465 dated Mar. 31, 2021, 11 pages.

International Preliminary Report on Patentability corresponding to International Patent Application No. PCT/US2020/067465 dated Sep. 9, 2022, 6 pages.

Invitation to pay additional fees received in PCT Application No. PCT/US2022/41242 mailed on Nov. 7, 2022, 2 pages.

International Search Report and Written Opinion of the International Searching Authority corresponding to International Patent Application No. PCT/US2022/041242 dated Jan. 20, 2023, 17 pages.

International Preliminary Report received in PCT Application No. PCT/US2022/41242, mailed on Mar. 7, 2024, 9 pages.

Notice of Publication corresponding to European Patent Application No. 22861991.2 dated Jun. 5, 2024.

Non-Final Office Action dated Nov. 6, 2024 in U.S. Appl. No. 17/802,474, 16 pages.

* cited by examiner

Neyland

SURFACE PERFORMANCE TESTING APPARATUS, SYSTEMS AND METHODS

CROSS-REFERENCE TO RELATED APPLICATIONS

This application is a continuation-in-part of PCT International Application Serial No. PCT/US2020/67465, filed on Dec. 30, 2020, which claims benefit of U.S. Provisional Patent Application Ser. No. 62/981,843, filed Feb. 26, 2020, each of which is herein incorporated by reference in their entireties.

TECHNICAL FIELD

Provided herein are surface performance testing apparatus and systems designed to be used to study various forces acting on an athletic field, another surface, and/or footwear caused by the interaction between footwear and the turf or surface during a simulated impact. Related methods of testing an athletic field, another surface, and/or footwear are provided. Methods, systems, and computer readable media for generating graphical representations associated with surface performance test information are provided.

BACKGROUND

Turf surfaces, including natural grass and artificial turf, as well as other athletic surfaces, are commonly used for sports and other physical activities and events. Properties of these surfaces, such as friction and traction, can vary widely among different surface types and can affect the suitability of a particular playing surface for particular activities, and may also correlate with the occurrence of injuries on that surface. Similarly, friction, traction and other properties of shoes, other footwear, and other structures used on such playing and turf surfaces can also vary widely. The ability to collect data and assess the playability and suitability of such varying surfaces is important for stakeholders and athletes.

There are several devices currently available to measure friction and traction forces at a shoe/turf interface; however, many of the available devices are undesirable and have significant drawbacks.

As such, what is needed are new devices, systems and methods to measure the friction, traction, deformation and cutting ability of turf and playing surfaces, preferably on-site using readily transportable equipment.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

In some embodiments, the presently disclosed subject matter provides a method for generating a graphical representation associated with surface performance test information. In some embodiments, the method comprises at a computing platform including a processor and a memory: receiving configuration information associated with a surface performance test, wherein receiving the configuration information includes receiving, via a user interface, test location information for identifying at least one user defined location of a surface to be tested in the surface performance test; obtaining surface performance test information acquired using at least one surface performance test apparatus; and generating at least one graphical representation indicating the surface performance test information associated with the at least one user defined location.

In some embodiments, in the disclosed methods the graphical representation includes a heatmap, a bar graph, a pie chart, an interactive graph, or an interactive chart.

In some embodiments, in the disclosed methods the surface performance test information includes information about the surface, information about the at least one surface performance test apparatus, information about footwear or test instrument(s) (e.g., an actuator, footwear, a shoe, a footform, etc.), and/or information about interactions between the footwear (or other test instrument) and the surface or the at least one surface performance test apparatus and the surface.

In some embodiments, in the disclosed methods the user interface is a graphical user interface and wherein receiving the test location information includes a user indicating multiple user defined locations by interacting with a visual representation of the surface.

In some embodiments, in the disclosed methods the surface performance test information includes information about soil moisture, surface hardness, head impact criteria, vertical deformation, energy restitution, force reduction, rotational traction, linear traction, infill depth, grass percentage, plant count, and/or surface temperature.

In some embodiments, in the disclosed methods the configuration information includes color information for indicating one or more colors or shades of a color to use when generating the at least one graphical representation.

In some embodiments, the presently disclosed subject matter provides a system for generating a graphical representation associated with surface performance test information. In some embodiments, the system comprises a computing platform comprising a processor and a memory. In some embodiments, the computing platform is configured for: receiving configuration information associated with a surface performance test, wherein receiving the configuration information includes receiving, via a user interface, test location information for identifying at least one user defined location of a surface to be tested in the surface performance test; obtaining surface performance test information acquired using at least one surface performance test apparatus; and generating at least one graphical representation indicating the surface performance test information associated with the at least one user defined location.

In some embodiments, in the disclosed systems the graphical representation includes a heatmap, a bar graph, a pie chart, an interactive graph, or an interactive chart.

In some embodiments, in the disclosed systems the surface performance test information includes information about the surface, information about the at least one surface performance test apparatus, information about footwear or test instrument(s) (e.g., an actuator, footwear, a shoe, a footform, etc.), and/or information about interactions between the footwear (or other test instrument) and the surface or the at least one surface performance test apparatus and the surface.

In some embodiments, in the disclosed systems the user interface is a graphical user interface and wherein receiving the test location information includes a user indicating multiple user defined locations by interacting with a visual representation of the surface.

In some embodiments, in the disclosed systems the surface performance test information includes information about soil moisture, surface hardness, head impact criteria, vertical deformation, energy restitution, force reduction, rotational traction, linear traction, infill depth, grass percentage, plant count, and/or surface temperature.

In some embodiments, in the disclosed systems the configuration information includes color information for indicating one or more colors or shades of a color to use when generating the at least one graphical representation.

In some embodiments, the presently disclosed subject matter provides computer executable instructions embodied in at least one computer readable medium that when executed by at least one processor of at least one computer cause the at least one computer to perform steps comprising: receiving configuration information associated with a surface performance test, wherein receiving the configuration information includes receiving, via a user interface, test location information for identifying at least one user defined location of a surface to be tested in the surface performance test; obtaining surface performance test information acquired using at least one surface performance test apparatus; and generating at least one graphical representation indicating the surface performance test information associated with the at least one user defined location.

In some embodiments, the presently disclosed subject matter provides a surface performance testing apparatus. In some embodiments, the apparatus comprises: a cart slidably affixed to a rail; an actuator mechanically linked to the cart; and a footform affixed to the cart, wherein the cart, rail and actuator are arranged to move the cart and attached footform at an angle relative to a substantially horizontal surface to be tested, whereby the footform contacts the surface to be tested at a desired contact angle.

In some embodiments, the surface performance testing apparatus further comprises a shoe affixed to the footform. In some embodiments, the apparatus is configured to cause the shoe to strike the surface to be tested at a desired force and at a desired contact angle. In some embodiments, the contact angle at which the shoe strikes the surface to be tested ranges from about 0 degrees to about 89 degrees, optionally about 20 degrees to about 45 degrees.

In some embodiments, the surface performance testing apparatus further comprises a connector component connecting the footform to the cart. In some embodiments, the connector component comprises one or more adjustable elements to allow angular and/or 360 degree rotational adjustment of the footform connected to the connector component. In some embodiments, the cart, rail and actuator are arranged within a housing, wherein the housing is rotatable at one end to adjust an angle of the housing relative to the substantially horizontal surface to be tested. In some embodiments, the cart, rail, actuator, footform and housing are mounted in an external framework. In some embodiments, an angle of the housing is adjustable within the external framework.

In some embodiments, the surface performance testing apparatus further comprises an activation element configured to control and/or activate the actuator. In some embodiments, the surface performance testing apparatus further comprises a plurality of actuators, optionally wherein one or more of the plurality of actuators is selected from a spring, pneumatic cylinder, hydraulic cylinder, chain driven, electronic actuator, cable, and combinations thereof. In some embodiments, an actuator can comprise anything that propels or causes the cart/shoe to engage or strike the surface to be tested. In some embodiments, such an actuator can comprise a chain or cable configured to be pulled to force the footform or shoe to strike the surface to be tested. In some embodiments, the actuator can comprise a weight, e.g. stacked weights, configured to force the cart towards the surface by gravity.

In some embodiments, the apparatus is configured to test any surface, natural or synthetic, used for sports or recreation, optionally an artificial turf surface, a natural turf surface, natural and synthetic equestrian performance surfaces, a track surface, a wooden court surface, a synthetic court surface, a clay court, a rolled clay surface, and/or hybrid surfaces. In some embodiments, the apparatus is configured to measure traction of acceleration, traction of deceleration and/or traction during cutting, optionally wherein traction of acceleration comprises the shoe striking the surface to be tested with the shoe facing substantially backward, optionally wherein traction of deceleration comprises the shoe striking the surface to be tested with the shoe facing substantially forward, and optionally wherein traction during cutting comprises the shoe striking the surface to be tested with the shoe facing substantially sideways at an angle of about 70 degrees to about 110 degrees from forward. In some embodiments, the apparatus is configured to measure and/or quantify a change, displacement, and/or compliance of the surface being tested.

In some embodiments, the surface performance testing apparatus further comprises one or more sensors, the one or more sensors selected from a force sensor, an accelerometer and/or a position sensor, optionally wherein the force sensor is positioned proximate to the actuator and configured to measure a force when the footform and/or shoe contacts the surface, optionally wherein the position sensor is positioned proximate to the rail and configured to measure a change in position when the footform and/or shoe contacts the surface, optionally wherein the accelerometer is configured to measure a change in speed when the footform and/or shoe contacts the surface. In some embodiments, the surface performance testing apparatus further comprises one or more image capturing devices, optionally one or more high-speed cameras.

In some embodiments, the surface performance testing apparatus is configured to be portable, optionally wherein the apparatus is configured to be transportable by a human subject, optionally wherein the apparatus is configured to weigh less than about 100 pounds, optionally less than about 150 pounds, optionally less than about 200 pounds. In some embodiments, the surface performance testing apparatus has a volume as defined by outer dimensions of the external frame, including length, width and height, of less than about 4 cubic feet, optionally less than about 3 cubic feet.

In some embodiments, the presently disclosed subject matter provides a surface performance testing system. In some embodiments, the system comprises: a surface performance testing apparatus in accordance with the presently disclosed subject matter; and a computing device, such as a computer, tablet or mobile device, for controlling the apparatus and/or collecting data from the apparatus. In some embodiments, the system further comprises a computer readable medium having stored thereon executable instructions that when executed by a processor of the computer control the computer to control the apparatus and/or collect data from the apparatus. In some embodiments, the system further comprises a set of selectable actuators, wherein the set of selectable actuators comprises multiple actuators of varying mechanical strengths, wherein the selectable actuators are interchangeable within the apparatus. In some embodiments, the system further comprises a set of selectable shoes, wherein the set of selectable shoes comprises multiple shoes of varying construction, size and/or tread pattern, wherein the selectable shoes are interchangeable within the apparatus.

In some embodiments, the presently disclosed subject matter provides a method of testing a surface. In some embodiments, the method comprises: providing a surface performance testing apparatus and/or system in accordance with the presently disclosed subject matter; applying the apparatus and/or system to a surface to be tested; and actuating the actuator to cause the shoe to contact the surface to be tested.

In some embodiments, the method further comprises measuring one or more forces generated during at least a portion of the shoe's contact with the surface. In some embodiments, the method further comprises evaluating the measurements taken and calculating traction of acceleration, traction of deceleration and/or traction during cutting. In some embodiments, the method further comprises adjusting the angle and/or orientation of the shoe prior to actuating the actuator of the apparatus and/or system. In some embodiments, the method further comprises adjusting the mechanical force of the actuator prior to actuation, and/or selecting a desired actuator strength prior to actuation of the apparatus and/or system. In some embodiments, the surface comprises any surface, natural or synthetic, used for sports or recreation, optionally an artificial turf surface, a natural turf surface, natural and synthetic equestrian performance surfaces, a track surface, a wooden court surface, a synthetic court surface, a clay court, a rolled clay surface, and/or hybrid surfaces. In some embodiments, the method further comprises determining the playability and/or performance of a surface to be tested. In some embodiments, the surface to be tested comprises a floor or work surface, wherein such methods further comprise determining an occupational safety parameter of the floor or work surface.

In some embodiments, in the disclosed methods the actuator is actuated a plurality of times across a plurality of locations on the surface to be tested, wherein measurements of the surface are collected from the plurality of locations on the surface. The plurality of locations on the surface from which the measurements of the surface are collected can in some embodiments be arranged in a grid pattern, wherein the measurements from the grid pattern can be collected and processed in real-time to create a mapped output of the collected measurements.

Accordingly, it is an object of the presently disclosed subject matter to provide devices, systems and methods to measure the friction, traction, deformation and cutting ability of turf and playing surfaces, preferably on-site using readily transportable equipment. These and other objects are achieved in whole or in part by the presently disclosed subject matter. Further, an object of the presently disclosed subject matter having been stated above, other objects and advantages of the presently disclosed subject matter will become apparent to those skilled in the art after a study of the following description, Drawings and Examples.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

For a more complete understanding of the presently disclosed subject matter, reference is now made to the following drawings in which.

DETAILED DESCRIPTION

Figure 1:
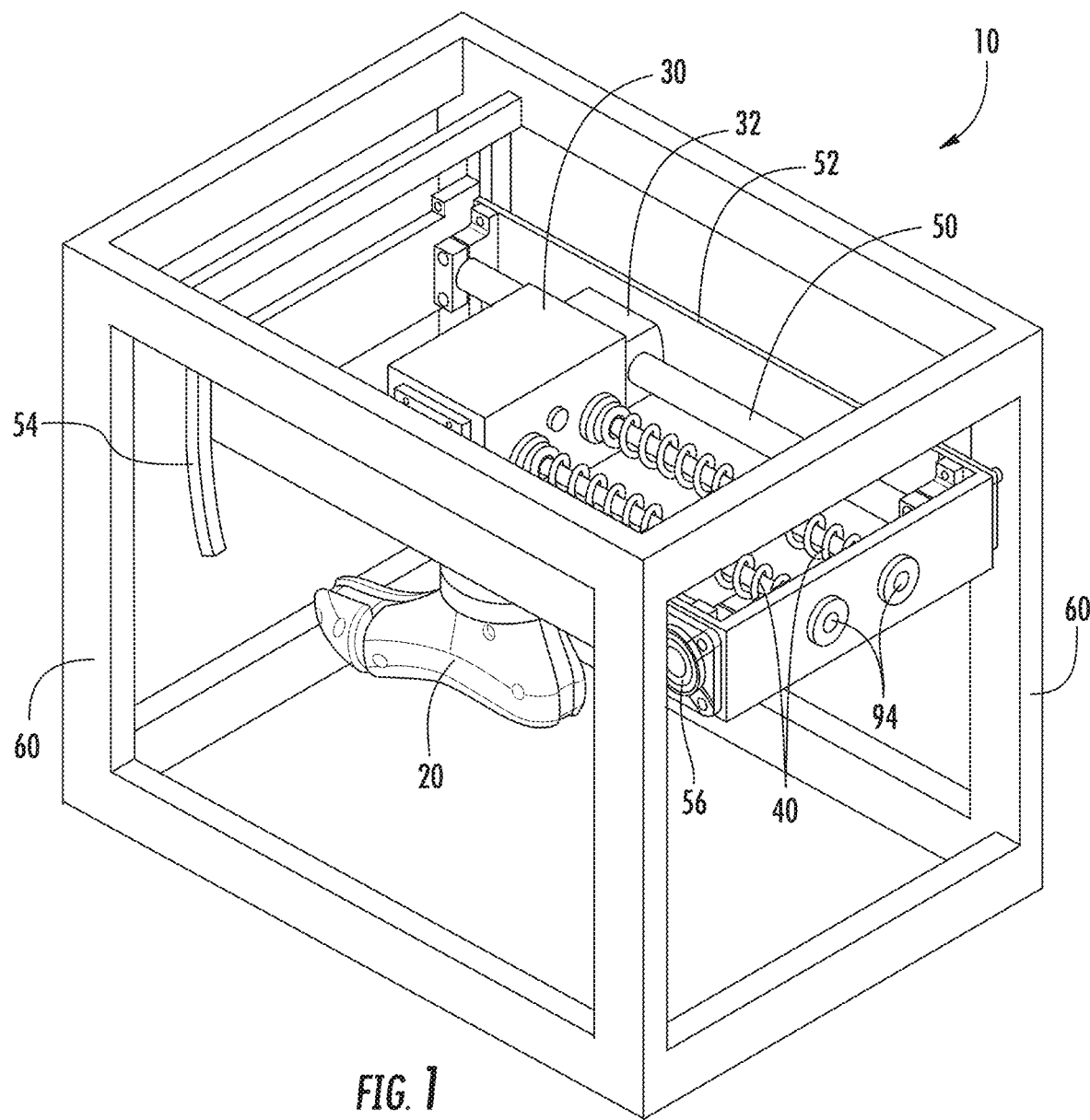
FIG. 1 is a perspective schematic view of an embodiment of a field or surface performance testing apparatus disclosed herein.
Figure 2:
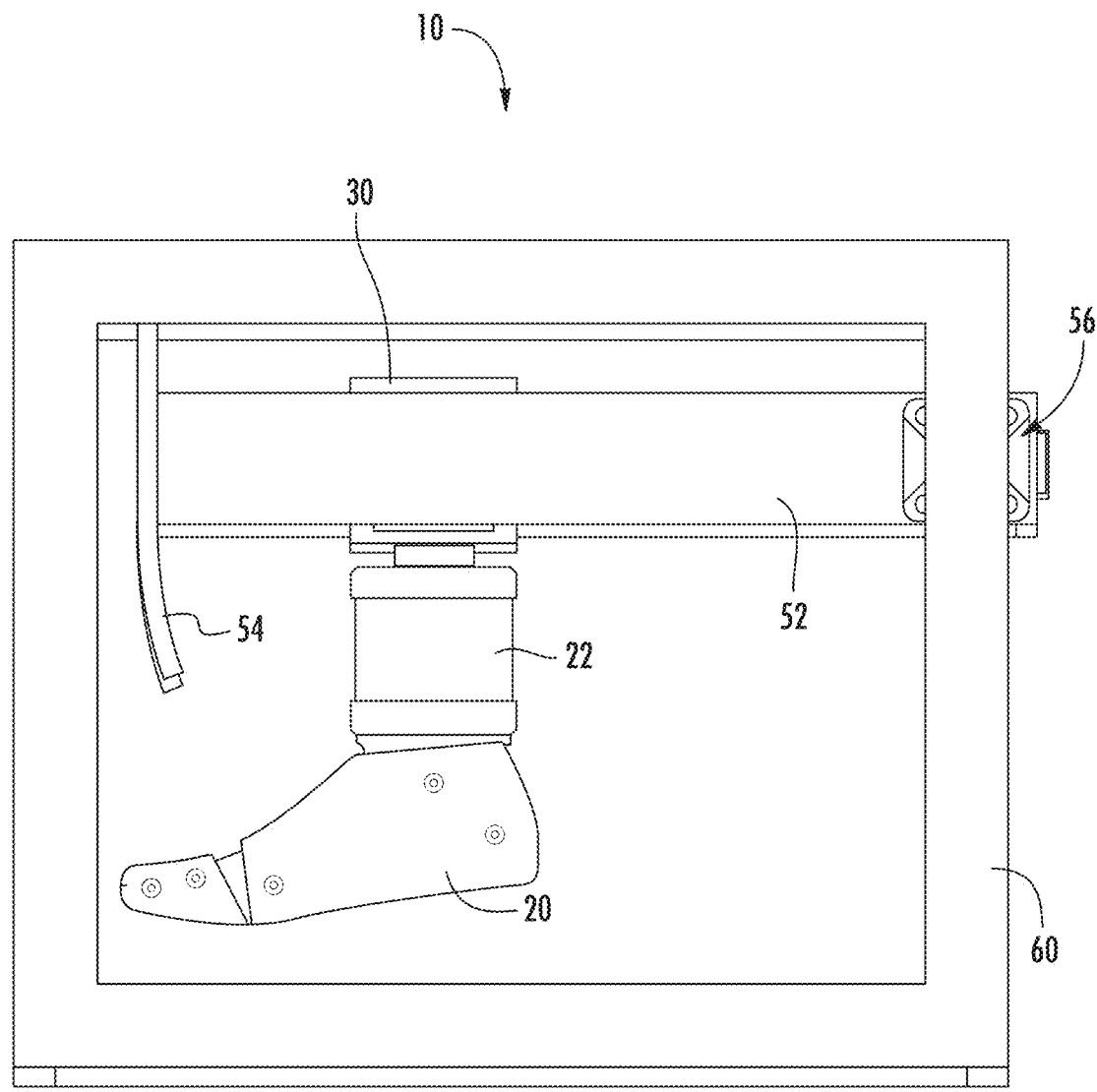
FIG. 2 is a side schematic view of an embodiment of a field or surface performance testing apparatus disclosed herein.

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

I. Definitions

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. Thus, for example, reference to "a sensor" includes a plurality of such sensors, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, dose, sequence identity (e.g., when comparing two or more nucleotide or amino acid sequences), mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

II. Portable Field Performance Testing Apparatus, Systems and Methods

Provided herein is a transportable device designed to measure a plurality of parameters of a surface, including for example but not limited to deceleration potential, acceleration potential, cutting traction potential, time to peak force, and vertical force of a surface. This device or apparatus utilizes mechanical actuators, for example two compression springs, that apply a given force when retracted that impacts a cart that is attached to a foot or footform. The cart will be retracted to the starting position and released as data collection begins. After force has been applied to the cart it will make the foot to strike the ground producing the data. In some embodiments, the application of force can be at an angle, which is in stark contrast to existing testing devices which, at best, provide only horizontal and vertical applications of force. By providing the application of force at an angle the disclosed devices and apparatuses more accurately mimic a human foot strike on a given surface.

In some embodiments, the presently disclosed subject matter provides a surface performance testing apparatus. In some embodiments, the apparatus comprises: a cart slidably affixed to a rail; an actuator mechanically linked to the cart; and a footform affixed to the cart, wherein the cart, rail and actuator are arranged to move the cart and attached footform at an angle relative to a substantially horizontal surface to be tested, whereby the footform contacts the surface to be tested at a desired contact angle.

In some embodiments, the surface performance testing apparatus further comprises a shoe affixed to the footform. In some embodiments, the apparatus is configured to cause the shoe to strike the surface to be tested at a desired force and at a desired contact angle. In some embodiments, the contact angle at which the shoe strikes the surface to be tested ranges from about 0 degrees to about 89 degrees, optionally about 20 degrees to about 45 degrees.

In some embodiments, the surface performance testing apparatus further comprises a connector component connecting the footform to the cart. In some embodiments, the connector component comprises one or more adjustable elements to allow angular and/or 360 degree rotational adjustment of the footform connected to the connector component. In some embodiments, the cart, rail, and actuator are arranged within a housing, wherein the housing is rotatable at one end to adjust an angle of the housing relative to the substantially horizontal surface to be tested. In some embodiments, the cart, rail, actuator, footform, and housing are mounted in an external framework. In some embodiments, an angle of the housing is adjustable within the external framework.

In some embodiments, the surface performance testing apparatus further comprises an activation element configured to control and/or activate the actuator. In some embodiments, the surface performance testing apparatus further comprises a plurality of actuators, optionally wherein one or more of the plurality of actuators is selected from a spring, pneumatic cylinder, hydraulic cylinder, chain driven, electronic actuator, cable, and combinations thereof. In some embodiments, an actuator can comprise anything that propels or causes the cart/shoe to engage or strike the surface to be tested.

In some embodiments, such an actuator can comprise a chain or cable configured to be pulled to force the footform or shoe to strike the surface to be tested. In some embodiments, the actuator can comprise a weight, e.g. stacked weights, configured to force the cart towards the surface by gravity. In some embodiments, the apparatus is configured to test any surface, natural or synthetic, used for sports or recreation, optionally an artificial turf surface, a natural turf surface, natural and synthetic equestrian performance surfaces, a track surface, a wooden court surface, a synthetic court surface, a clay court, a rolled clay surface, and/or hybrid surfaces. In some embodiments, the apparatus is configured to measure traction of acceleration, traction of deceleration and/or traction during cutting, optionally wherein traction of acceleration comprises the shoe striking the surface to be tested with the shoe facing substantially backward, optionally wherein traction of deceleration comprises the shoe striking the surface to be tested with the shoe facing substantially forward, and optionally wherein traction during cutting comprises the shoe striking the surface to be tested with the shoe facing substantially sideways at an angle of about 70 degrees to about 110 degrees from forward. In some embodiments, the apparatus is configured to measure and/or quantify a change, displacement, and/or compliance of the surface being tested.

In some embodiments, the surface performance testing apparatus further comprises one or more sensors. In some embodiments, the one or more sensors is selected from the group comprising a force sensor, an accelerometer and/or a position sensor, optionally wherein the force sensor is positioned proximate to the actuator and configured to measure a force when the footform and/or shoe contacts the surface, optionally wherein the position sensor is positioned proximate to the rail and configured to measure a change in position when the footform and/or shoe contacts the surface, optionally wherein the accelerometer is configured to measure a change in speed when the footform and/or shoe contacts the surface. In some embodiments, the surface performance testing apparatus further comprises one or more image capturing devices, optionally one or more high-speed cameras.

Turning now to the Figures, FIGS. 1 through 4 schematically show an embodiment of a field performance testing apparatus 10, also referred to as a turf testing apparatus or device, for testing a field or athletic surface and collecting data related thereto. Similarly, FIGS. 5 through 8 include schematic images of embodiments of a field performance testing apparatus 10. In some aspects apparatus 10 is designed to measure deceleration, acceleration, and cutting traction potential on a surface S as it relates to the interface of a shoe 24 with surface S.

Apparatus 10 as disclosed herein is designed to be used in some embodiments to study various forces acting on an athletic field or an athletic surface caused by the interaction between a shoe and the turf or athletic surface during a simulated impact. Various surfaces can be tested and analyzed, including assessing deceleration, acceleration and cutting traction potential, among other properties and parameters, on the surfaces. The disclosed apparatuses and systems can in some aspects be configured to measure and/or quantify a change, displacement, and/or compliance of the surface being tested. The disclosed apparatuses and systems allow for the testing of a wide variety of footwear, at any desired impact angle, and at various simulated forces.

More particularly, apparatus 10 can be used to test different shoes, cleats, boots, etc. for differences in their impact on the body and different aspects of traction values. As disclosed in the studies discussed herein, differences can be found in even closely related cleat types (similar models), while large differences in performance can be found in very different type of cleats resulting in very different results. Such an apparatus affords the significant advantage of providing, for example, testing for a shoe company to determine the impact the different shoe designs could have on traction and forces generated experienced by the body. Thus, the term "surface performance test information" also includes information about footwear being tested.

In some embodiments, apparatus 10 can be fitted with animal foot or hoof, or a device mimicking the same, to test a surface S upon which such a hoof or foot will be contacting. By way of example and not limitation, apparatus 10 can be fitted with a horse hoof or model thereof to test the performance characteristics of a racing track surface. Optionally, a horse shoe, or variations thereof, could be tested as well to determine performance characteristics of horse shoes and/or the track or surface upon which the horse will be in contact.

Surface S can be any field, performance or athletic surface, including for example any surface, natural or synthetic, used for sports or recreation, optionally an artificial turf surface, a natural turf surface, natural and synthetic equestrian performance surfaces, a track surface, a wooden court surface, a synthetic court surface, a clay court, a rolled clay court surface, and/or hybrid surfaces. Other surfaces to be tested can include equestrian, dog or other animal performance surfaces, including but not limited to horse race tracks, equestrian performance surfaces, e.g. show rings, and dog race tracks. Other surfaces to be tested can include various terrains and natural land surfaces, including for example desert sand, mountain terrain, etc., where shoes, boots and other footwear may need testing for applications such as military, law enforcement, search and rescue, and the like. Moreover, other surfaces to be tested can include various floors and flooring materials where subjects may be standing for extended periods of time for occupational purposes, e.g. factory floors, warehouse floors, hospital floors, office space floors, retail shop floors, etc. In some embodiments, both the floor or surface can be tested, as well as the shoe and shoe material to be used on the floor, and the interface between the two.

Generally, apparatus 10 can in some aspects comprise a footform (or foot) 20 attached to cart 30, which is designed to be moved by actuator 40 to thereby cause cart 30 to travel along rails 50 and force footform 20 (and the shoe 24 thereon) to interact with a surface to be tested. In some aspects, all or most of these components can be mounted completely or substantially within, and supported by, external framework 60.

In some embodiments, surface performance testing apparatus 10 can comprise cart 30 slidably affixed to rail 50, with actuator 40 mechanically linked to cart 30, with footform 20 affixed to cart 30. As shown in FIGS. 1, 3, 6 and 23A, for example, cart 30, rail 50 and actuator 40 can be arranged to move cart 30 and attached footform 20 at an angle relative to a substantially horizontal surface S to be tested (see FIGS. 10, 15-17 and 23A-23B), whereby footform 20 contacts surface S to be tested at a desired contact angle. Note that in FIGS. 1-4 footform 20 is shown in a substantially upright, or horizontal, position prior to being adjusted downward for testing as discussed hereinbelow.

A shoe 24 (or cleat 220 in FIGS. 23A-23B) can be affixed to the footform 20 (e.g. a foot prosthetic or other device configured to mimic a human foot) by sliding the shoe onto the footform similar to a human subject putting on a shoe. Shoe 24/220 can be any type of footwear (e.g., athletic shoes, non-athletic shoes, shoes with cleats, non-cleated shoes, shoes with spikes, non-slip shoes, walking shoes, running shoes, orthopedic shoes, work shoes, work boots, casual shoes, etc.) for which testing against a surface S is desired or needed. Shoe 24/220 can also include other articles for which testing is desired, including for example and without limitation, an article simulating an animal hoof or horseshoe, a bare foot, a prosthetic, or a material to be used in a shoe or other article. Shoe 24/220 can in some aspects be mounted or otherwise affixed to footform 20 thereby allowing shoe 24/220 to be securely associated with and/or affixed to apparatus 10. Such a configuration also allows shoe 24/220 to be interchangeable, i.e. easily removed and replaced, with other footwear or testing materials on foot 20. Footform 20 can be configured as a standard foot size, e.g. size 10, or can be adjustable to accommodate varying sizes of shoes.

Figure 23A:
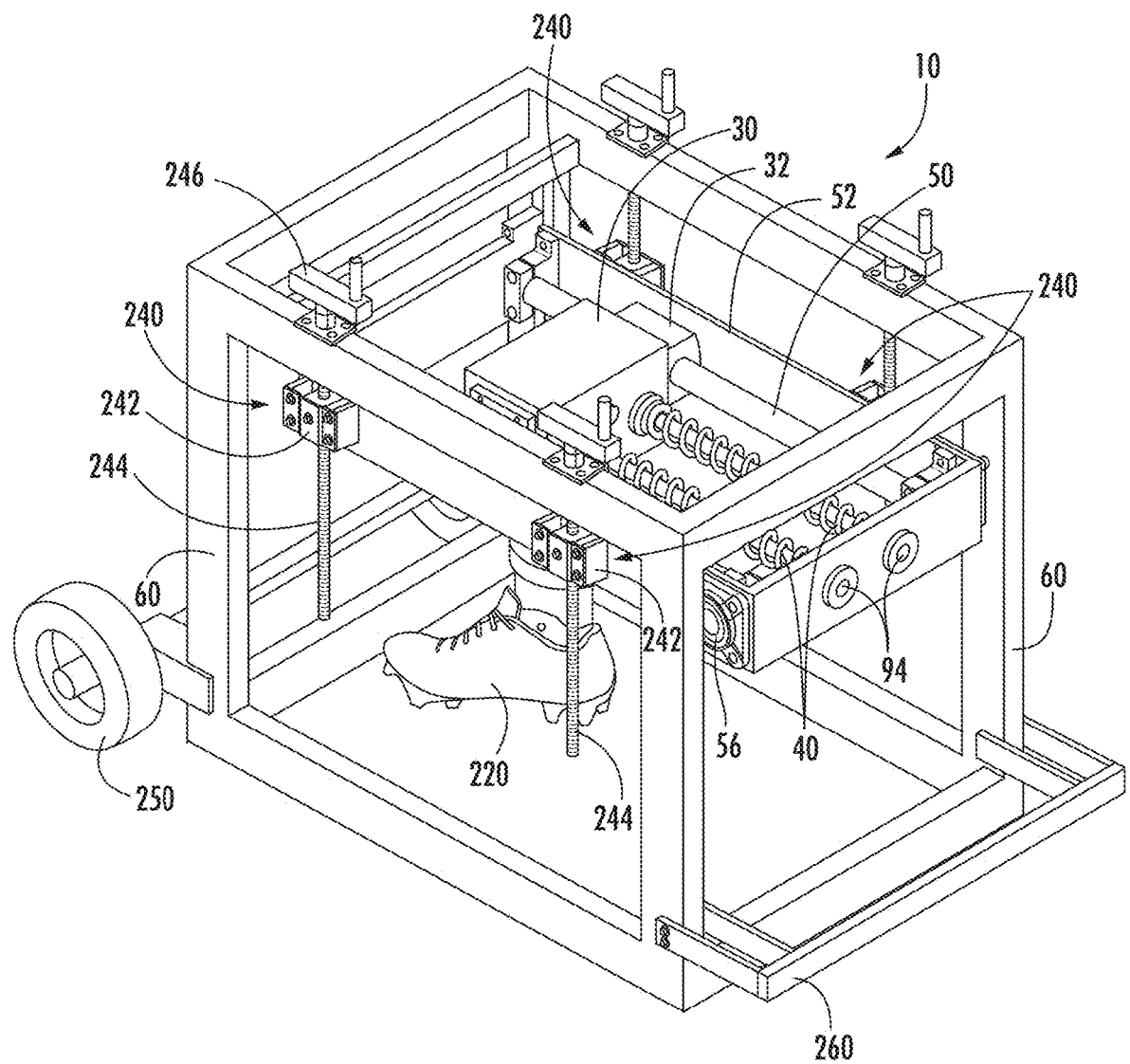
FIGS. 23A and 23B are perspective and side schematic views, respectively, of an embodiment of a field or surface performance testing apparatus disclosed herein.
Figure 23B:
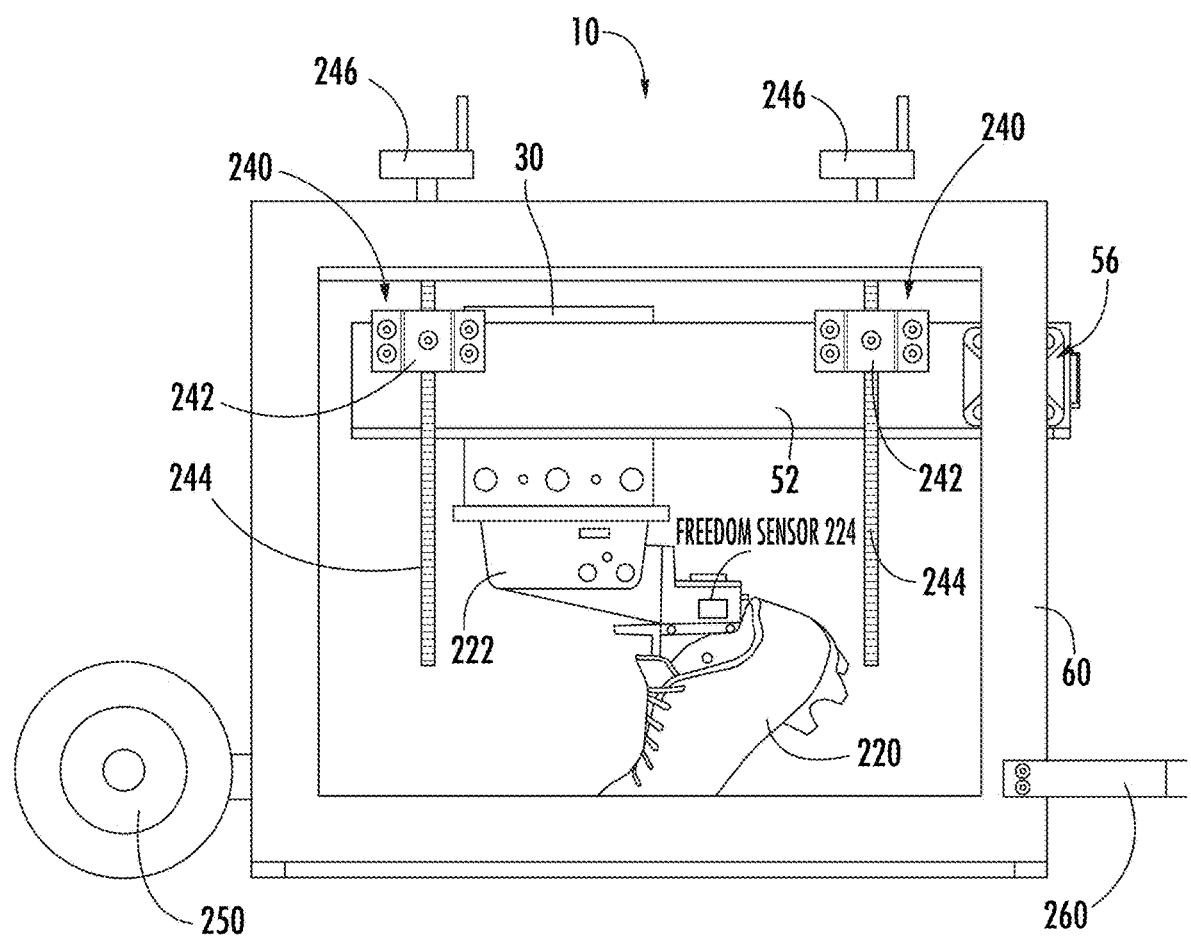

Foot 20 can be connected to or mechanically liked with cart 30 via connector (connector component) 22 as depicted in FIGS. 1-4, 10 and 11, or connector 222 shown in FIG. 23B. Connector 22/222 can be any structural member, e.g. rod, shaft, beam, etc., suitable to connect foot 20 to cart 30 and transmit the motion (forward, reverse, angular or lateral motion) and force from cart 30 to foot 20. For example, connector 22/222 can be a rod, shaft, cylinder, dowel, beam, bracket, rod or the like, made from any suitable material, including metal, steel, composite, plastic, or the like. Connector 22/222 can connect to foot 20 near the rear and/or top of the foot, similar to where the ankle may be located on a subject's foot, or any other suitable location sufficient to secure foot 20 to connector 22/222 but not interfere with the interchangeability of the shoe 24.

Figure 11:
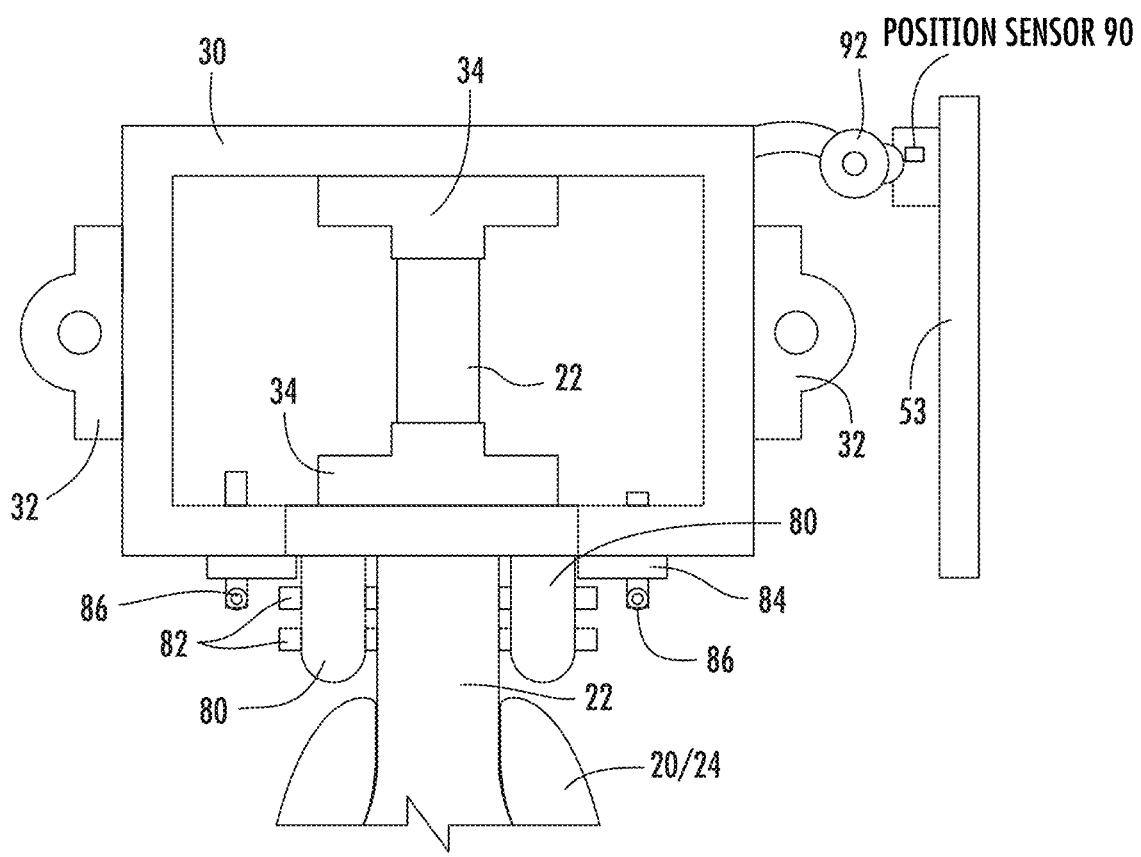
FIG. 11 is a schematic illustration of components of an embodiment of a field or surface performance testing apparatus disclosed herein.
Figure 12:
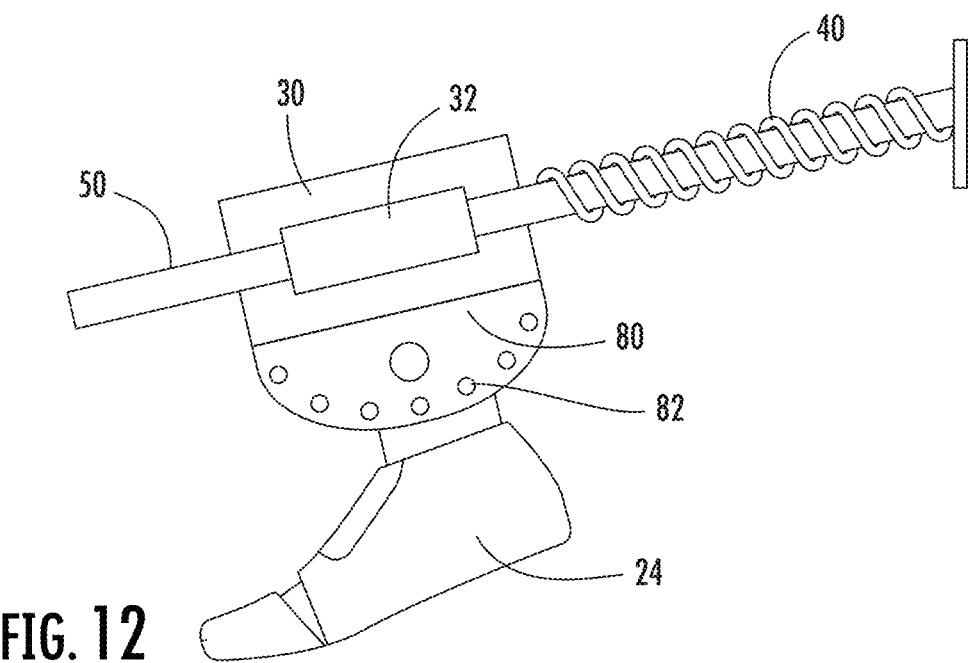
FIG. 12 is a schematic illustration of components of an embodiment of a field or surface performance testing apparatus disclosed herein.
Figure 13:
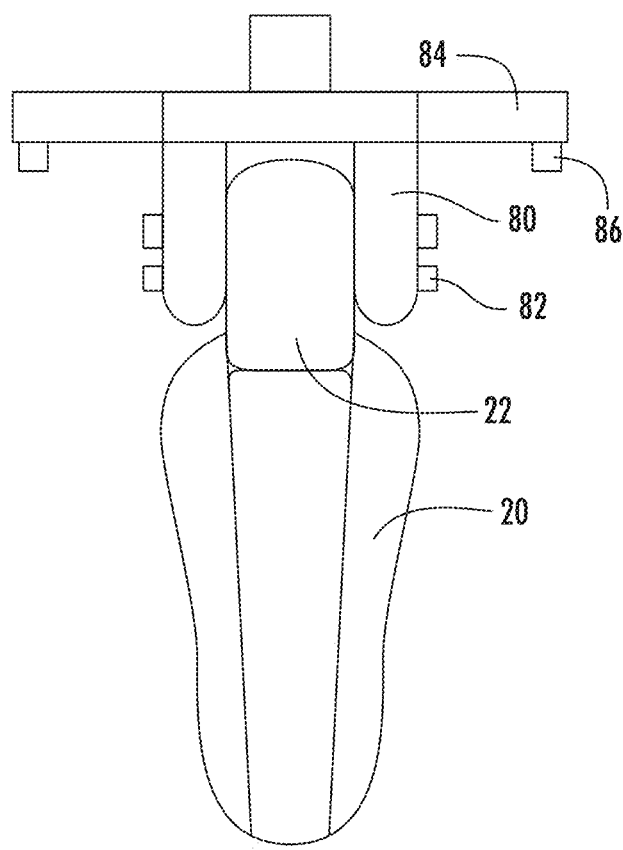
FIG. 13 is a schematic illustration of components of an embodiment of a field or surface performance testing apparatus disclosed herein.
Figure 14:
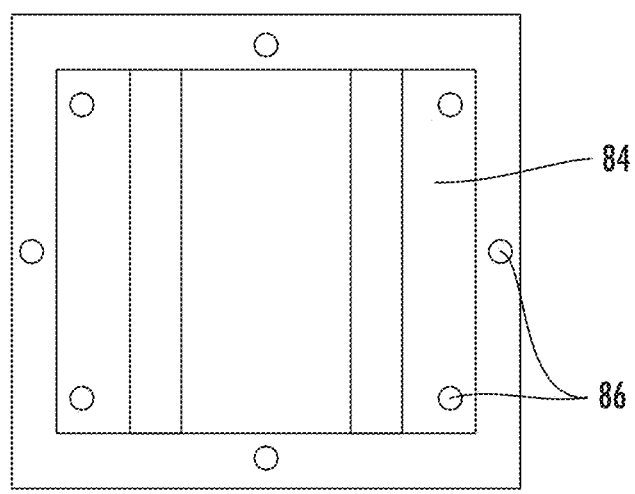
FIG. 14 is a schematic illustration of components of an embodiment of a field or surface performance testing apparatus disclosed herein.

In some aspects, and as shown in FIGS. 11-14 and 23B, connector 22/222 can comprise one or more adjustable elements or adjustable plates 80/84 allowing connector 22 and foot 20 to be adjustably connected or affixed to cart 30, to thereby allow angular and/or rotational adjustment of footform 20. Plates 80, as shown in FIGS. 11 and 12, can comprise one or more, sometimes two, parallel plates with a plurality of adjustable connections 82, e.g. bolt and bolt holes, to allow the angle of connector 22 and foot 20 to be changed with respect to cart 30. In some aspects, connector 22 can comprise a substantially horizontal plate 84, oriented perpendicular to plates 80 (see FIG. 11), can include a plurality of offset bolt holes and connection points 86 such that foot 20 can be rotated 360 degrees and secured at any desired position, including rotation in 90 degree increments. See, e.g., FIGS. 11, 13 and 14 (showing a planar view of plate 84).

Figure 7:
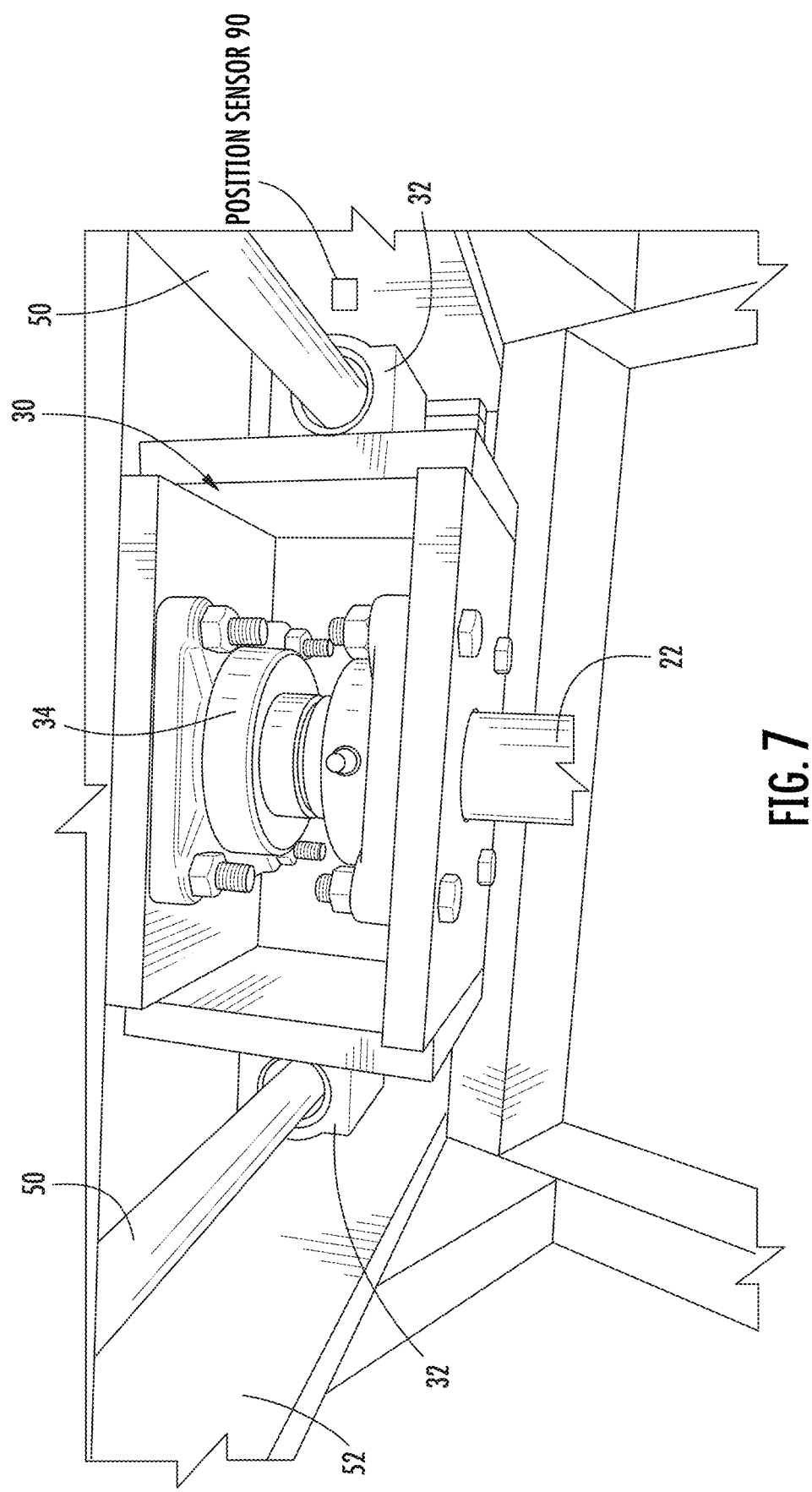
FIG. 7 is a close-up view of components of an embodiment of a field or surface performance testing apparatus disclosed herein.
Figure 8:
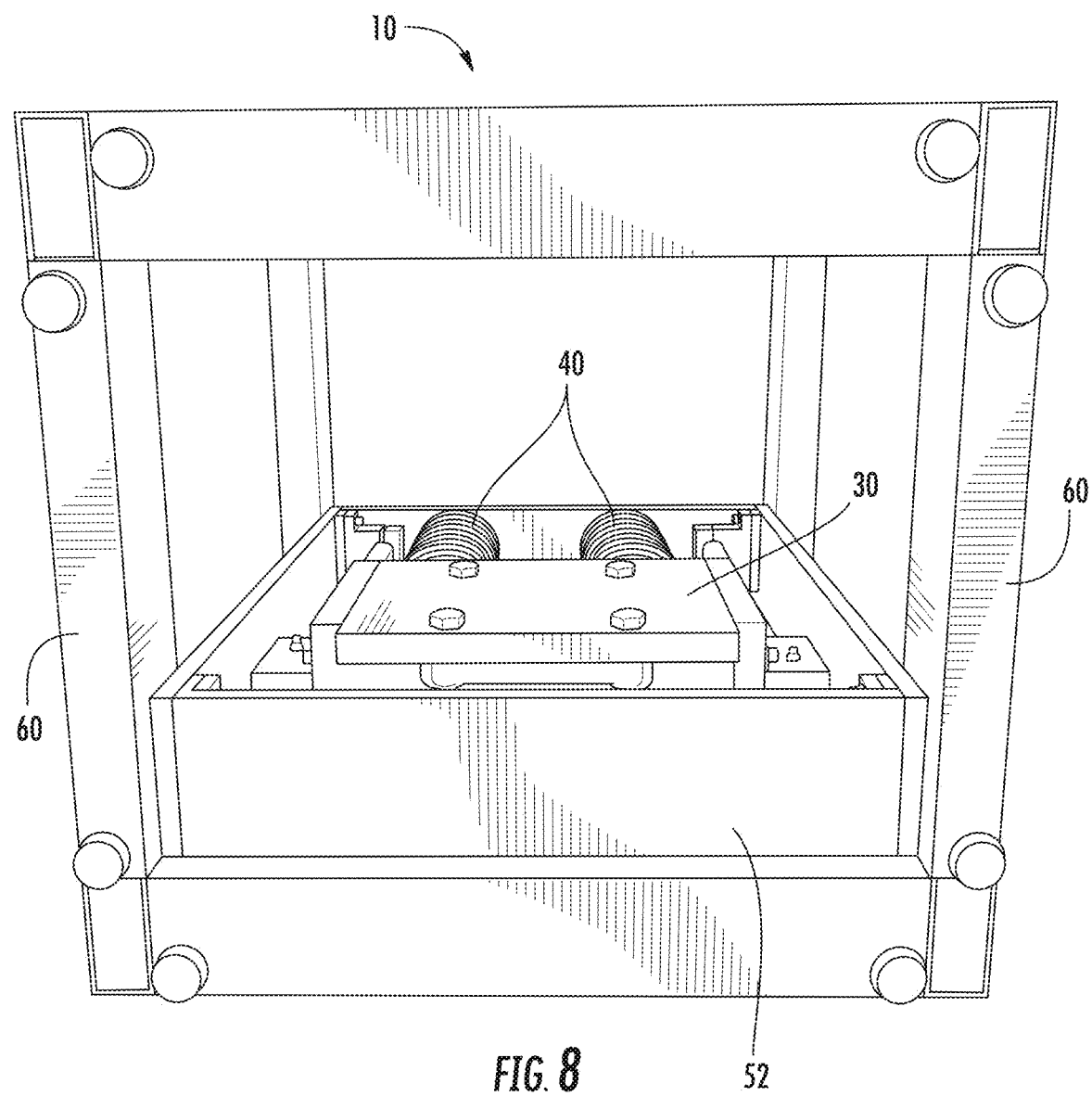
FIG. 8 is a close-up rear view of components of an embodiment of a field or surface performance testing apparatus disclosed herein.
Figure 9:
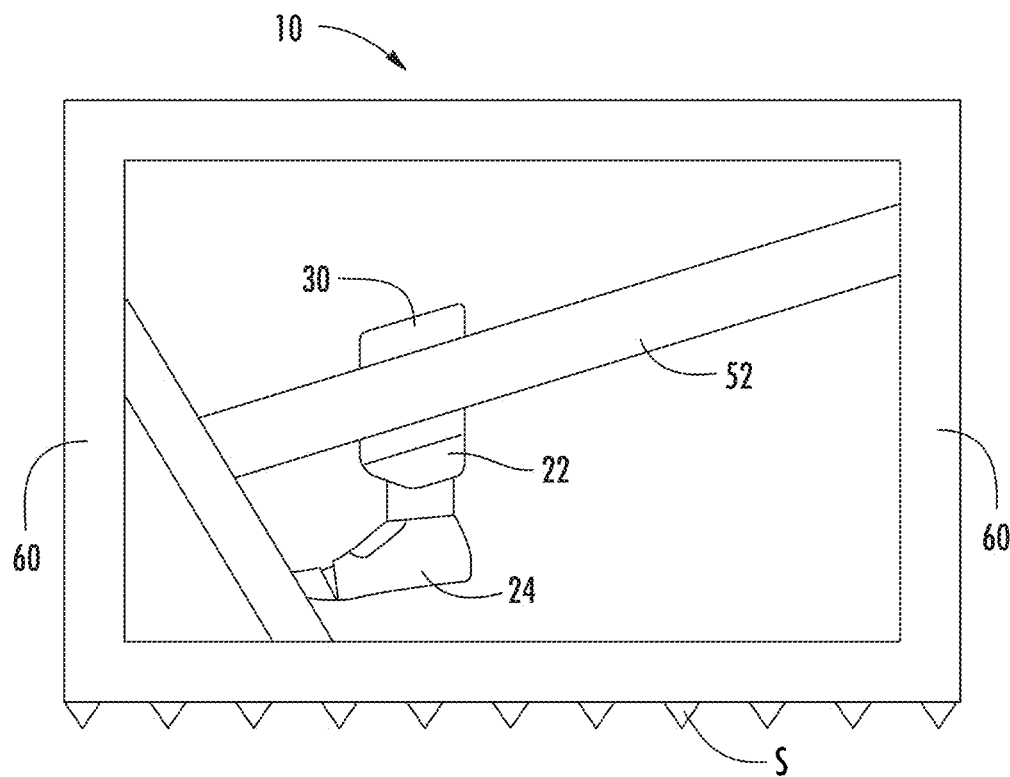
FIG. 9 is a schematic illustration of components of an embodiment of a field or surface performance testing apparatus disclosed herein.
Figure 10:
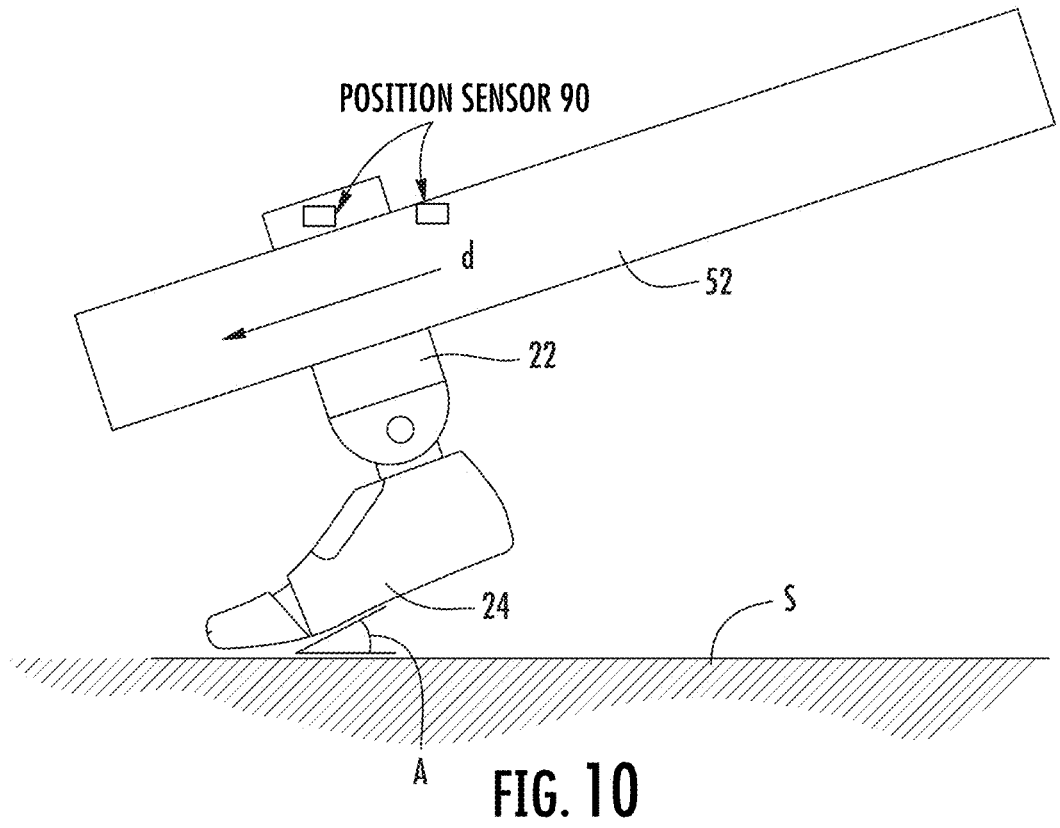
FIG. 10 is a schematic illustration of components of an embodiment of a field or surface performance testing apparatus disclosed herein.

Connector 22 can also be rotatably housed within cart 30 as shown in FIG. 7. In such an embodiment connector 22 can be supported by one or more bearings 34 and extend from cart 30 such that it can be rotated as desired around an axis of rotation as support by bearings 34.

The adjustability of connector 22 and/or adjustable plates 80/84 can allow the position and/or orientation of shoe 24 relative to the rest of the apparatus 10, and/or relative to surface S to be adjusted. For example, in some embodiments, connector 22 and/or adjustable plates 80/84 can include one or more pivots for adjusting the rotational orientation of shoe 24, or shoe 24/foot 20 assembly, relative to the turf surface S.

Figure 15:
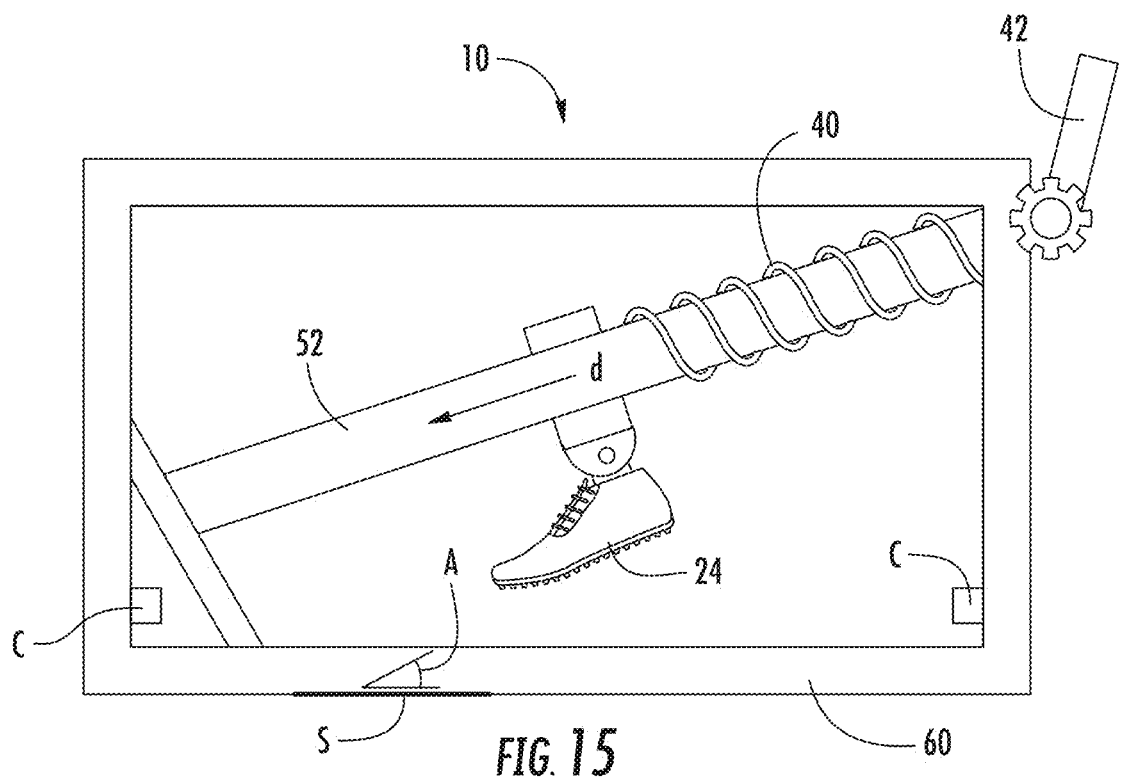
FIG. 15 is a schematic illustration of components of an embodiment of a field or surface performance testing apparatus disclosed herein during use.
Figure 16:
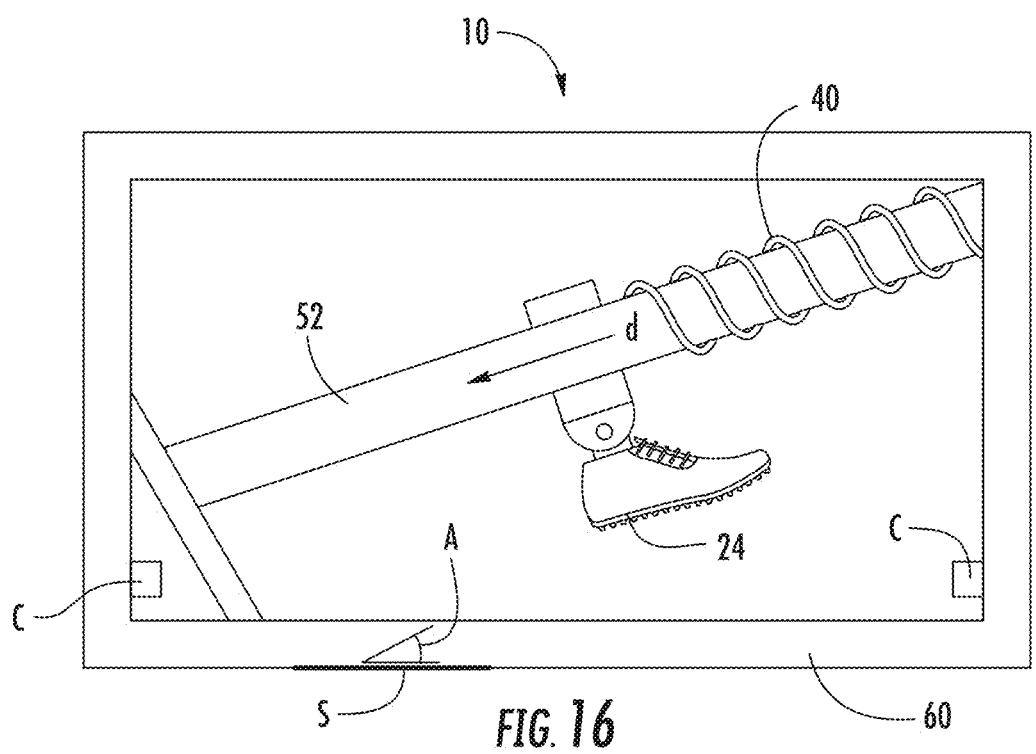
FIG. 16 is a schematic illustration of components of an embodiment of a field or surface performance testing apparatus disclosed herein during use.
Figure 17:
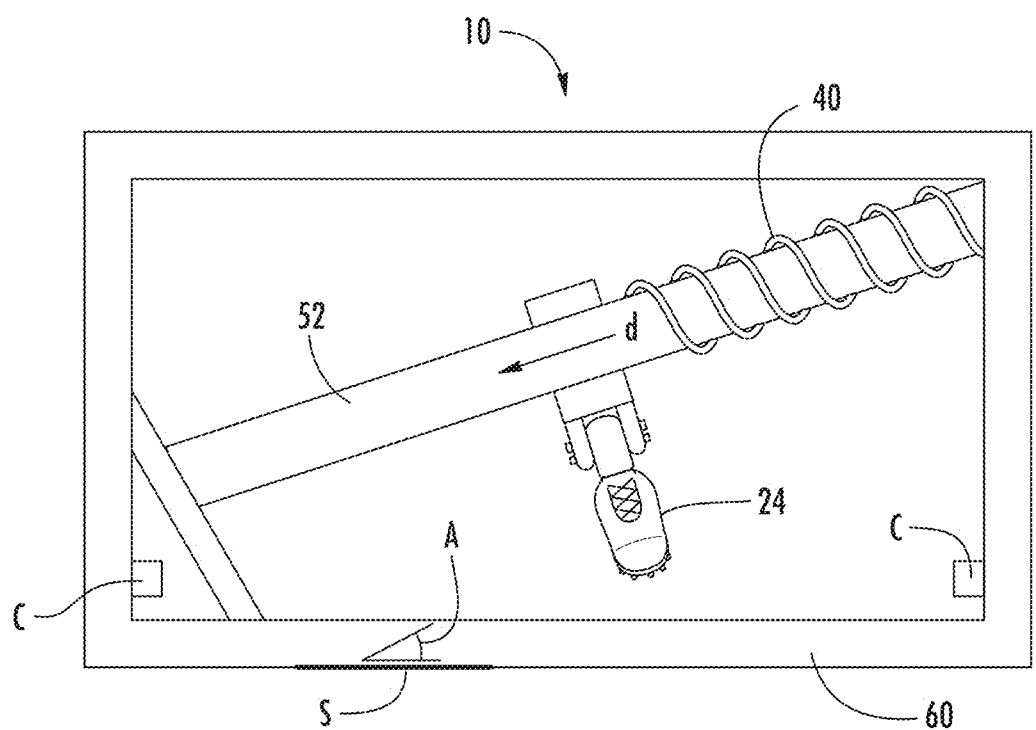
FIG. 17 is a schematic illustration of components of an embodiment of a field or surface performance testing apparatus disclosed herein during use.

Moreover, by rotating shoe 24 the orientation of the shoe can be such that deceleration, acceleration, and/or cutting forces can be measured, as depicted in FIGS. 15, 16 and 17, respectively. FIG. 15 depicts a deceleration setup where the toe of shoe 24 is facing forward with respect to the direction d of travel of cart 30 upon activation by actuator 40, and with respect to surface S. FIG. 16 depicts an acceleration setup where the heel of shoe 24 is facing forward with respect to the direction d of travel of cart 30 upon activation by actuator 40, and with respect to surface S. FIG. 17 depicts a cutting setup where one side of shoe 24 is facing forward with respect to the direction d of travel of cart 30 upon activation by actuator 40, and with respect to surface S. Any angle or intermediate position in between these depicted in FIGS. 15-17 can also be accommodated based on the adjustability of connector 22 and/or adjustable plates 80/84.

In some embodiments, performance testing apparatus 10 can be configured to cause shoe 24 to strike the surface S to be tested at a desired force and at a desired contact angle A. The contact angle A at which shoe 24 strikes the surface S to be tested ranges from about 0 degrees to about 89 degrees, and in some aspects preferably about 20 degrees to about 45 degrees, although the apparatus is designed such that the shoe can contact the test surface at any angle ranging from about 5 degrees to about 85 degrees, including but not limited to about 5, 6, 7, 8, 9, 10, 11, 12, 13, 14, 15, 20, 25, 30, 35, 40, 45, 50, 55, 60, 65, 70, 75, 80, 85, and 89 degrees. The contact angle A at which shoe 24 (or footform 20) strikes surface S is achieved in one single motion, instead of two motions, i.e. vertical and horizontal. The single angular motion more closely mimics the contact and force exerted by a subject, e.g. an athlete, performing on the surface to be tested.

As shown in FIGS. 1-4, 6, 15-17 and 23A-23B, cart 30, rail 50 and actuator 40 can be arranged within housing 52. Housing 52 can be mounted in external framework 60 in a fixed or adjustable manner. Housing 52 is configured to position cart 30, rail 50 and actuator 40 within external framework 60, and allow such components to be set to a desired angle a to thereby cause footform 20 to strike a test surface S at a desired contact angle A. In some aspects, housing 52 can be rotatable at one end, including for example by using a pivot point 56, as shown in FIGS. 1-4. Housing 52 can be adjusted at an angle relative to the substantially horizontal surface S to be tested and/or relative to external framework 60, as shown in FIGS. 6 and 5-17.

Referring to FIGS. 1-4, the angle or position of housing 52 can be adjustable within external framework 60 by pivoting at pivot point 56 at one end and along guide 54 at on opposing end. Guide 54 can in some aspects allow housing 52 to be positioned and stabilized at a desired angle a within external framework 60.

Alternatively, as shown in the embodiment depicted in FIGS. 23A and 23B, the angle or position of housing 52 can be adjustable within external framework 60 adjusting one or more of adjustment elements 240. Adjustment components 240 can in some aspects allow housing 52 to be positioned and stabilized at a desired angle within external framework 60. Adjustment components 240 can comprise a receiver 242 fixed to a side of housing 52 and configured to threadably receive threaded rod 244. At one end of threaded rod 244, e.g. at an upper end as shown in FIGS. 23A and 23B, a control handle 246 can be affixed to threaded rod 244 to allow a user to readily rotate threaded rod 244, which due to the threaded engagement with receiver 242 fixed to housing 52 causes a portion of housing 52, e.g. a corner or side, to adjust vertically up or down. Threaded rod 244 can also in some embodiments pass through a portion of housing 60, and can in some embodiments be threadably engaged thereto, as shown in FIGS. 23A and 23B. By adjusting one or more of control handles 246 independently or simultaneously housing 52 can be adjustable within external framework 60 at any desired position or angle.

Actuator 40 can comprise a spring, pneumatic cylinder, piston, chain driven, electronic actuator, cable or other device capable of applying a force to move cart 30 upon activation. Actuator 40 can in some embodiments comprise a plurality of such devices, including for example two springs as depicted in FIGS. 1-4. Optionally, actuator 40 can comprise a single, optionally stronger, spring. Upon activation actuator 40 moves cart 30 in a forward direction d along rails 50 to thereby cause foot 20 to strike or come into contact with surface S. Actuator 40 can be adjusted or calibrated to simulate a directional force of a shoe striking a surface S during acceleration, deceleration, cutting or any other movement desired be tested on surface S. Actuator 40 can be adjustable to simulate varying forces to mimic different foot/shoe contacts and actions by a subject. Actuator 40 can also include functionality to adjust the speed of the advancement of cart 30.

The devices and apparatuses can further comprise an activation element 42 configured to control and/or activate actuator 40, as shown in FIG. 15. Activation element 42 can comprise a lever, handle, knob or other structure suitable for engaging actuator 40 in such a way as to prepare actuator 40 for use and subsequently controlling the activation thereof. For example, activation element 42 can be a lever mechanism to pull back the one or more springs of actuator 40 and then release the same at a desired time of activation.

Figure 3:
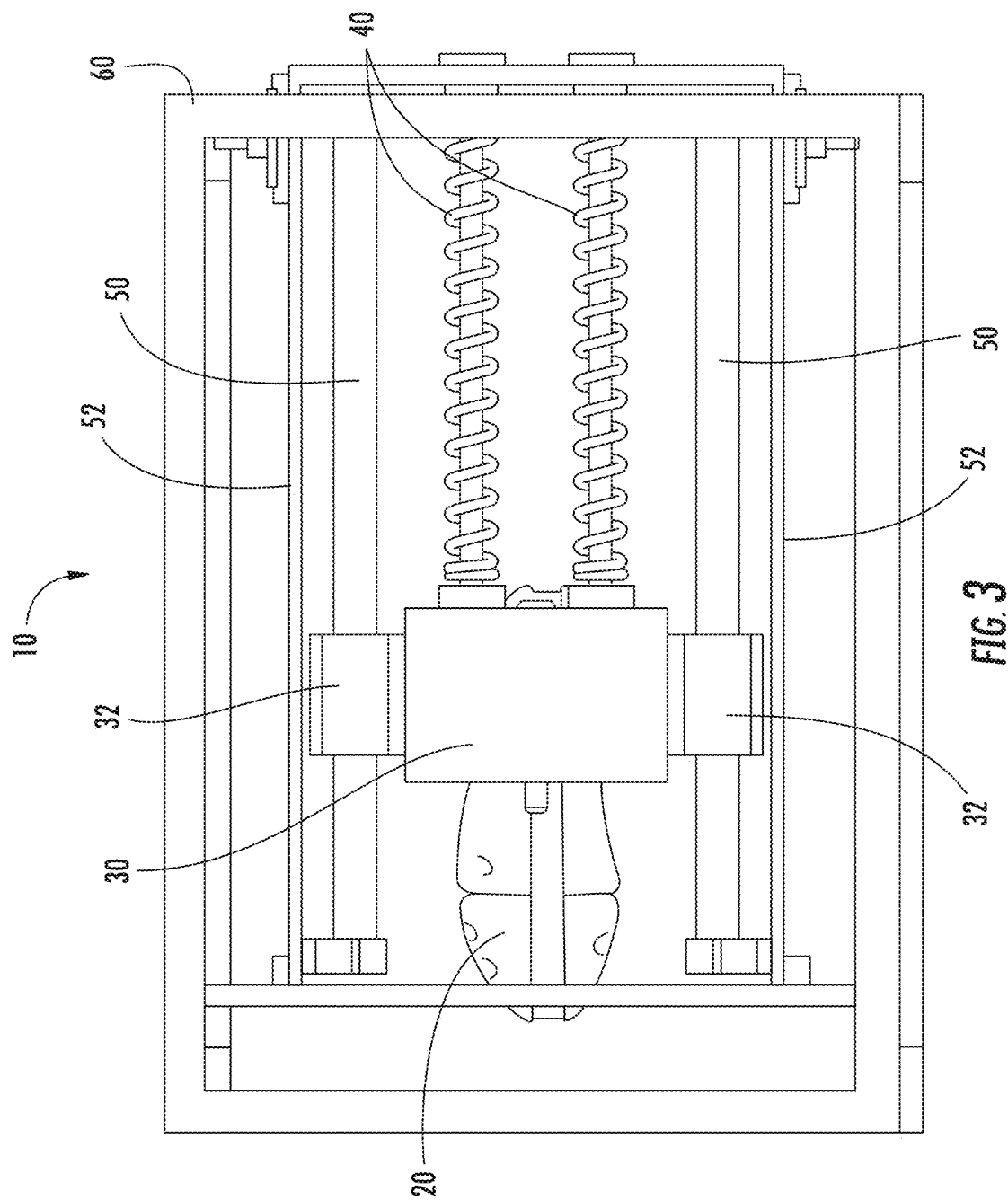
FIG. 3 is a planar schematic view of an embodiment of a field or surface performance testing apparatus disclosed herein.
Figure 4:
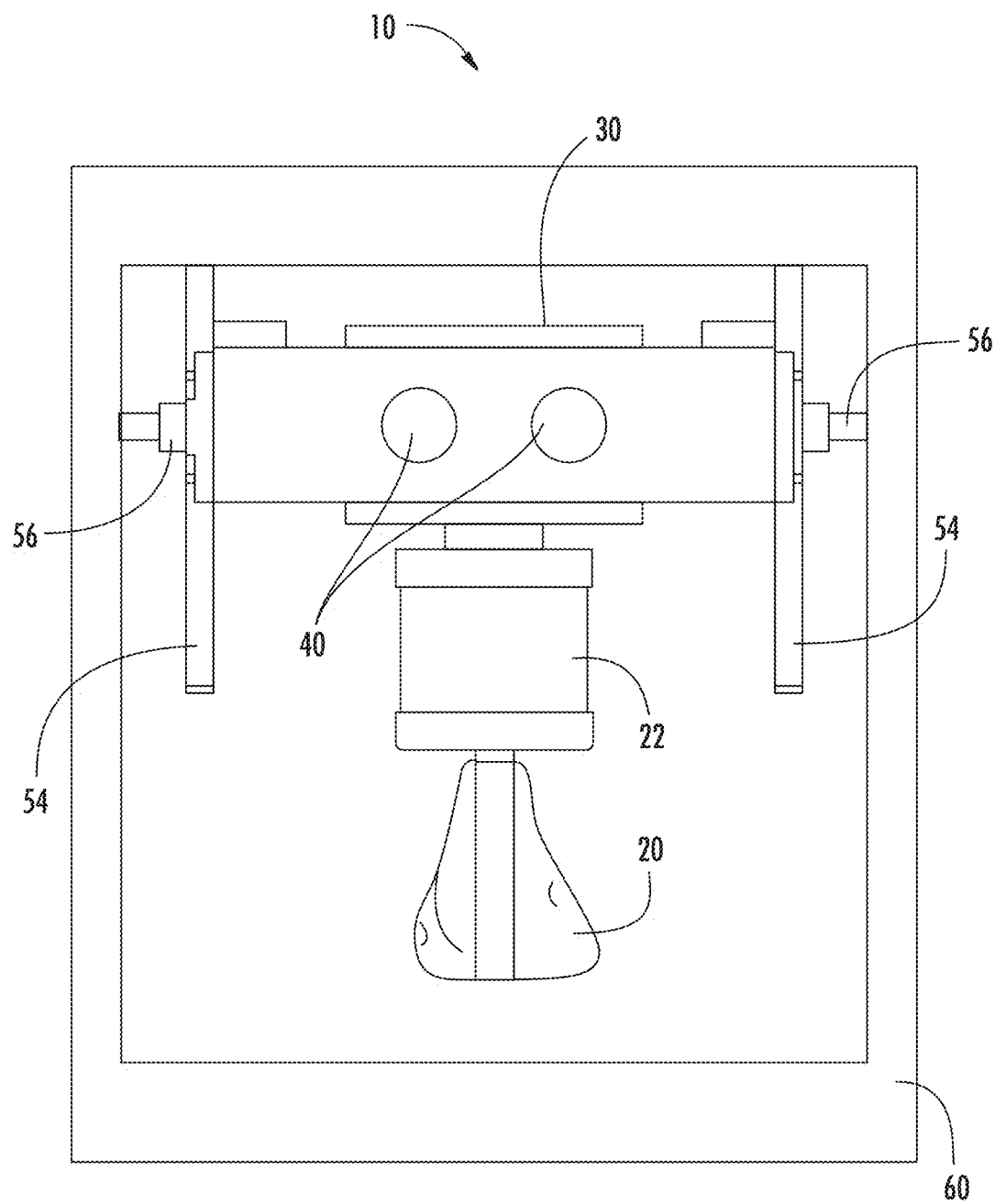
FIG. 4 is an end schematic view of an embodiment of a field or surface performance testing apparatus disclosed herein.
Figure 5:
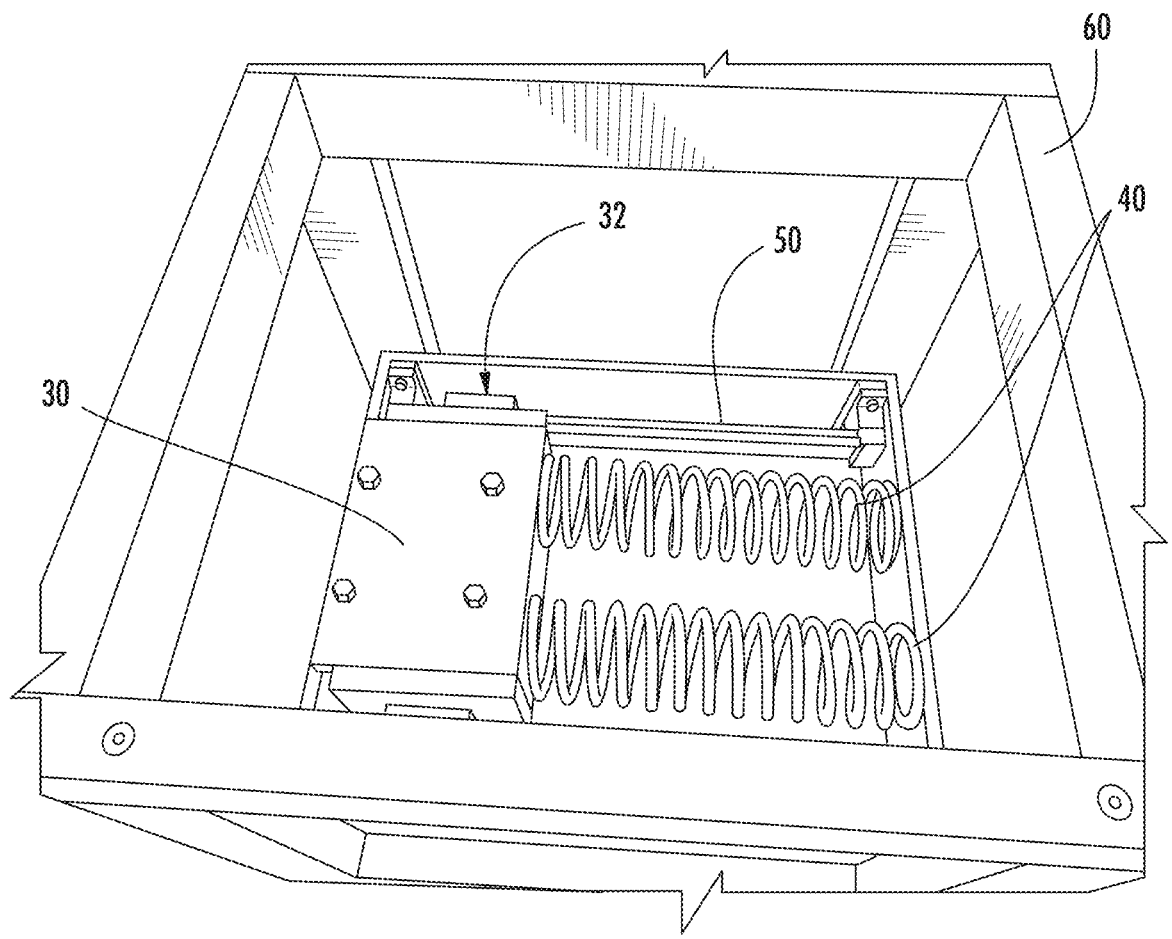
FIG. 5 is a top perspective schematic view of an embodiment of a field or surface performance testing apparatus disclosed herein.
Figure 6:
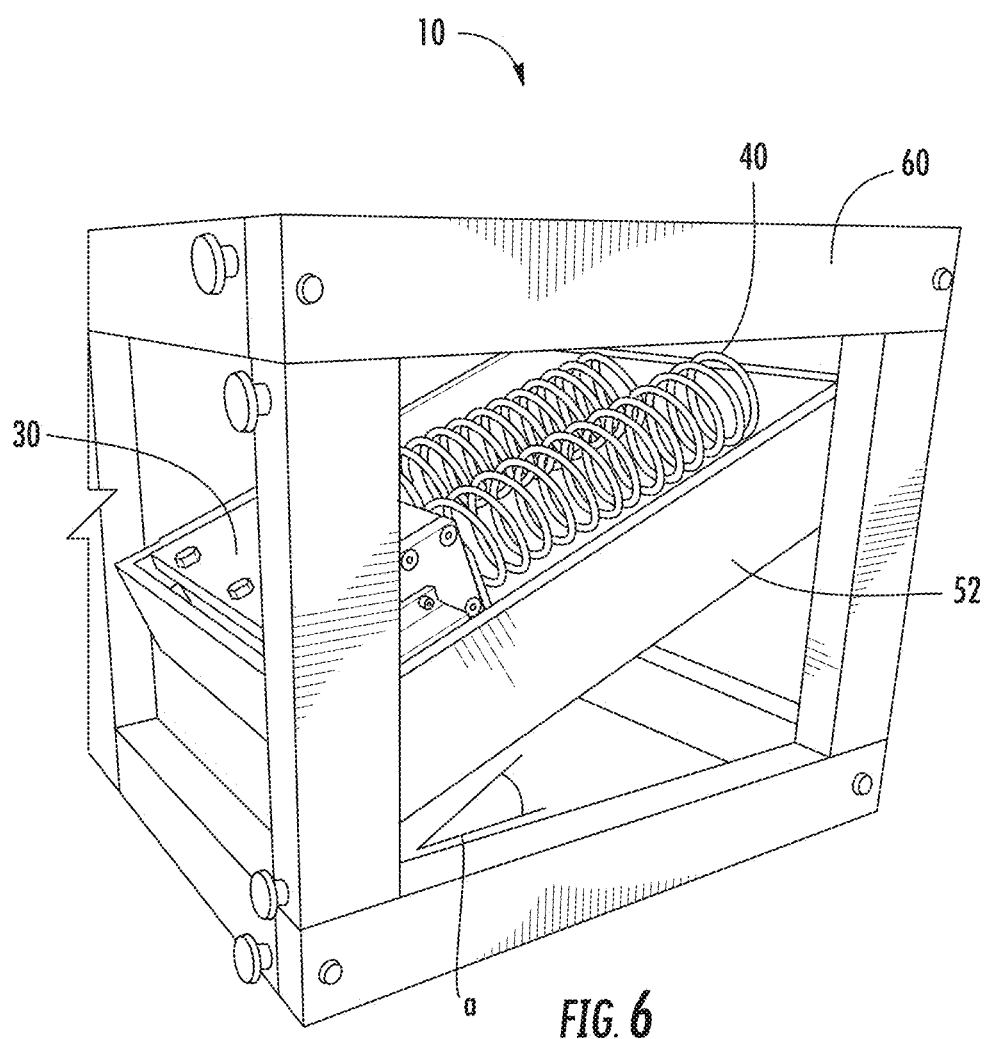
FIG. 6 is a perspective schematic view of an embodiment of a field or surface performance testing apparatus disclosed herein.

Upon activation of actuator 40, cart 30 is advanced in a forward direction d due to the force applied by actuator 40. Cart 30 is driven along one or more rails 50, where rails 50 can in some embodiments extend generally along a substantially parallel track as housing 52, as shown in FIGS. 1, 3, and 5. Rails 50 are mounted on and/or within housing 52, which is adjustably mounted in external framework 60. Cart 30 travels along a defined plane due to being slidably affixed to rail 50. As shown in FIGS. 3, 7, and 11, couplers 32 slidingly engage rails 50 on each side of cart 30, and are affixed to opposing sides of cart 30. Couplers 32 act to smoothly and consistently guide cart 30 in a single plane upon activation to transfer the forward momentum and energy to footform 20 until striking the test surface.

Apparatus 10 includes in some embodiments one or more sensors for detection and recording data during use of the apparatus. The one or more sensors can include, but are not limited to, a force sensor, an accelerometer and/or a position sensor. By way of example and not limitation, the force sensor can be positioned proximate to the actuator and configured to measure a force when the footform and/or shoe contacts the surface. In some embodiments, a force sensor can comprise a three degree of freedom sensor or three component force sensor, optionally positioned or mounted within the apparatus such that it is parallel or substantially parallel to the ground. Such a three degree of freedom sensor can in some aspects be configured to read force in three different directions or on three axises. A position sensor can be positioned proximate to the rail and cart and configured to measure a change in position when the footform and/or shoe contacts the surface. Finally, an accelerometer can be configured to measure a change in speed when the footform and/or shoe contacts the surface.

To elaborate on the three degree of freedom measurement capability, having this sensor (i.e. the three degree of freedom sensor and/or three component force sensor, e.g. Triax ICP® force sensor, 10 k lb (Fz), 4000 lb (Fx,y), 0.25 mV/lb (z), 1.25 mV/lb (x, y)) allows for the collecting of torque experienced at the ankle (so potential to roll of the ankle), and at the metatarsophalangeal joint (so the increase potential for turf toe). These forces can be combined, if desired, with other measured forces, including for example a vertical force through the toe and a horizontal force acting on the against the foot.

To elaborate, and referring to the figures, one or more force sensors can be positioned in apparatus 10 to detect forces on foot 20/220, connector 22/222, cart 30 and/or rails 50. As shown in Figure, force sensors 94 can be positioned at one end of actuator(s) 40 to thereby measure a force exerted by the actuator and any return force or recoil at the moment of foot strike. Force sensors 94 can be positioned at any suitable location on cart 30, actuator 40, connector 22 and/or footform 20. Additionally, as shown in FIG. 23B, three degree of freedom sensor 224 (or three component force sensor) can be positioned between foot 220 and connector 222.

In additional to force sensors, accelerometers and position sensors can detect and measure speeds, movement and relative location of one or more components during use of apparatus 10. Such sensors can be used to detect, measure and calculate deceleration, acceleration, cutting, deceleration time, and/or displacement. Referring to FIGS. 7 and 11, position sensor 90 can be located proximate to rail 50, cart 30 and/or on housing 53. Position sensor 90 can be configured to detect and measure a change in position, i.e. movement, of cart 30 along rail 50. Position sensor 90 can be configured to work in coordination with a magnet 92 as shown in FIG. 11 to detect a change in position of cart 30 to which magnet 92 is affixed.

In some embodiments, the disclosed testing apparatus 10 can further comprise image collecting devices or cameras C, including for example but not limited to high-speed cameras, as illustrated in FIGS. 15-17. By way of example and not limitation, a camera C can be mounted on the framework 60 or otherwise positioned within the apparatus 10 such that it is parallel or substantially parallel to the foot (or shoe 24) at the point of the foot striking the surface S to be tested. In some embodiments, camera C can be positioned to be facing the foot such that it can record images or video to determine how far the foot moves once it comes into contact with surface S to be tested. In some embodiments, a camera C can be mounted on the framework 60 or otherwise positioned within the apparatus 10 proximate to the rear of the device and facing the foot (or shoe 24) as it moves away from camera C toward surface S to be tested, as shown in FIGS. 15-17. In some embodiments, additional cameras or image collecting devices can be incorporated within the apparatus to record images and videos as needed to assess a surface performance. Such image collecting/capturing devices can be mounted on and/or within the apparatus and allow for the collection of images during testing, i.e. when a shoe strikes a test surface. Upon collection of such images further digital image analysis can be performed to assess the performance of a tested surface.

External framework 60 can be made of any material suitable for providing structural support to apparatus 10, including for example metal, plastic, polycarbonate composites and the like. A material sufficiently strong but lightweight can be advantageous in certain applications. In some embodiments, framework 60 can further comprise one or more cleats or anti-slip elements to improve the traction of the apparatus against a test surface during testing. That is, in order to obtain accurate measurements of the shoe striking the test surface the apparatus itself may need to be secured in position during the testing. Cleats or other non-slip material or components can help secure the apparatus in place. Additional weight can also be added to the apparatus, including for example auxiliary weights and/or fillable weighted bladders.

In some embodiments, and as shown in FIGS. 23A and 23B, testing apparatus 10 can comprise one or more wheels 250 for improving transportability of the apparatus. Moreover, in some embodiments, a standing platform 260 can be positioned at one end of the framework 60.

As discussed herein, testing apparatus 10 is configured to measure traction of acceleration, traction of deceleration and/or traction during cutting, wherein traction of acceleration comprises the shoe striking the surface to be tested with the shoe facing substantially backward, wherein traction of deceleration comprises the shoe striking the surface to be tested with the shoe facing substantially forward, and wherein traction during cutting comprises the shoe striking the surface to be tested with the shoe facing substantially sideways at an angle of about 70 degrees to about 110 degrees from forward.

One significant advantage of the presently disclosed turf testing apparatus is the size and scale of the apparatus. That is, apparatus 10, for example, is configured to be small and readily portable, particularly to be easily transportable by a single human subject. To achieve such the apparatus is desirably configured to weigh less than about 100 pounds, optionally less than about 150 pounds, optionally less than about 200 pounds. Additionally, the apparatus can be approximately 10 to 30 inches wide, 15 to 35 inches long, and 8 to 20 inches tall, or by way of example only, about 18 inches wide, by 23 inches long, by 12 inches tall. Stated differently, the apparatus can have a volume as defined by outer dimensions of the external frame 60, including length, width and height, of less than about 4 cubic feet, preferably less than about 3 cubic feet. Prior to the instant disclosure, no such apparatus, device or system has been designed or conceived that can achieve the desired testing while also being so readily transportable. Importantly, the design of the disclosed testing apparatus allows a single individual to travel with the apparatus to any location where testing is needed, including long distance air travel where baggage requirements limit the size and weight of the apparatus. The relative ease with which the disclosed apparatus allow it to be transported provides the ability for the disclosed apparatus to be widely used to test various playing and athletic surfaces whenever needed, i.e. prior to sporting and athletic events.

Thus, in some embodiments, the surface performance testing apparatus is configured to be portable, optionally wherein the apparatus is configured to be transportable by a human subject, optionally wherein the apparatus is configured to weigh less than about 100 pounds, optionally less than about 150 pounds, optionally less than about 200 pounds. In some embodiments, the surface performance testing apparatus has a volume as defined by outer dimensions of the external frame, including length, width and height, of less than about 4 cubic feet, optionally less than about 3 cubic feet.

Figure 21:
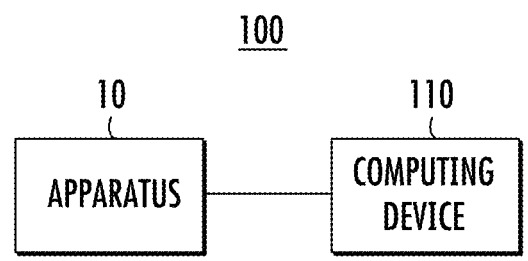
FIG. 21 is a schematic illustration of a surface performance testing system.

In some embodiments, the presently disclosed subject matter provides a surface performance testing system 100 (FIG. 21). In some embodiments, he system 100 comprises: a surface performance testing apparatus 10 in accordance with the presently disclosed subject matter; and a computing device 110, such as but not limited to a computer, tablet or mobile device for controlling the apparatus and/or collecting data from the apparatus. In some embodiments, the system further comprises a computer readable medium having stored thereon executable instructions that when executed by a processor of the computer control the computer to control the apparatus and/or collect data from the apparatus.

The disclosed surface performance testing apparatus can be further combined with additional elements and/or components to form a usable system and/or kit. For example, in some embodiments such a testing system can comprise a set of selectable actuators, wherein the set of the selectable actuators comprises multiple actuators of varying mechanical strengths. The selectable actuators can be interchangeable within the apparatus, such that when in use an operator can select and install the appropriate actuator to simulate a desired force. Correspondingly, a system or kit can comprise a set of selectable shoes, wherein the set of selectable shoes comprises multiple shoes of varying construction, size and/or tread pattern, wherein the selectable shoes are interchangeable within the apparatus.

In some embodiments, the disclosed testing apparatus can further comprise a computing device, such as a computer, tablet or mobile device for controlling the apparatus and/or collecting data from the apparatus. The surface performance testing apparatus and associated computer can comprise a testing system. Such a system, and particularly the computer, can comprise a computer readable medium having stored thereon executable instructions that when executed by a processor of the computer control the computer to control the apparatus and/or collect data from the apparatus.

In some embodiments, the disclosed testing apparatus can further comprise image collecting devices, including for example but not limited to high-speed cameras. By way of example and not limitation, a first camera can be mounted on the framework or otherwise positioned within the apparatus such that it is parallel or substantially parallel to the foot at the point of the foot striking the surface to be tested. In some embodiments, the first camera can be positioned to be facing the foot such that it can record images or video to determine how far the foot moves once it comes into contact with the surface to be tested. In some embodiments, a second camera can be mounted on the framework or otherwise positioned within the apparatus proximate to the rear of the device and facing the foot as it moves away from the camera toward the surface to be tested. In some embodiments, additional cameras or image collecting devices can be incorporated within the apparatus to record images and videos as needed to assess a surface performance. Such image collecting/capturing devices can be mounted on and/or within the apparatus and allow for the collection of images during testing, i.e. when a shoe strikes a test surface. Upon collection of such images further digital image analysis can be performed to assess the performance of a tested surface.

The subject matter disclosed herein can be implemented in software in combination with hardware and/or firmware. For example, the subject matter described herein can be implemented in software executed by a processor. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

Figure 24:
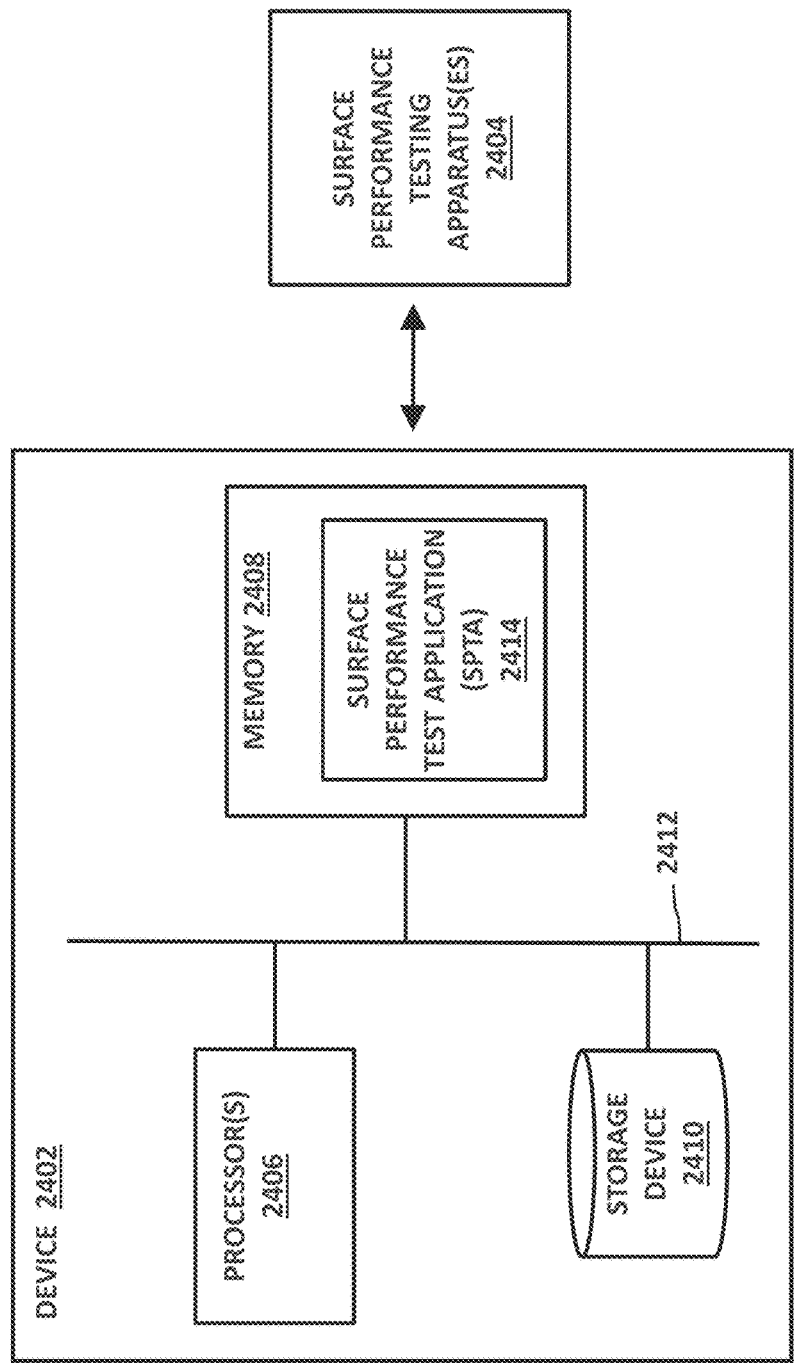
FIG. 24 is a block diagram illustrating a test system for surface performance testing.

FIG. 24 is a block diagram illustrating an example test system 2400 for surface performance testing. Referring to FIG. 24, system 2400 includes computing device 2402 and one or more surface performance testing apparatus(es) 2404, e.g., surface performance testing apparatus 10 or surface test devices. Computing device 2402 may represent any suitable entity or entities (e.g., software executing on one or more processors, a computing platform, a smartphone, a distributed computing system, wireless and wired systems, etc.) configured for controlling apparatus(es) 2404 or aspects thereof, collecting data from apparatus(es) 2404, obtaining input from a user (e.g., a test operator or a management system) and/or a storage system (e.g., a network attached storage (NAS) and a storage area network (SAN)), and/or providing output to a display or other entity (e.g., a user or a data analysis device). For example, computing device 2402 may be a computer, a tablet, or a mobile device executing one or more applications for interacting with a user and/or apparatus(es) 2404. In this example, computing device 2402 or application(s) therein may be used to configure how or where apparatus(es) 2404 are testing a playing surface or other surface (e.g., a football field, a racetrack, a baseball field, a basketball court, a tennis court, a work floor, etc.) and/or may be used to provide various information so that results are generated and/or displayed (e.g., via graphical data representations like heat maps or interactive charts) for appropriate (e.g., user defined) areas.

Computing device 2402 may include one or more processor(s) 2406, a memory 2408, and a storage device 2410 communicatively connected via a system bus 2412. In some embodiments, processor(s) 2406 can include a microprocessor, central processing unit (CPU), or any other like hardware based processing unit. In some embodiments, a surface performance test application (SPTA) 2414 can be stored in memory 2408, which can include random access memory (RAM), read only memory (ROM), optical read/write memory, cache memory, magnetic read/write memory, flash memory, or any other non-transitory computer readable medium. In some embodiments, processor(s) 2406 and memory 2408 can be used to execute and manage the operation of SPTA 2414. In some embodiments, storage device 2410 can include any storage medium or storage unit that is configured to store data accessible by processor(s) 2406 via system bus 2412. Example storage device 2410 can include one or more databases hosted by or accessible to test system 2400.

SPTA 2414 may be any suitable entity (e.g., software executing on a smartphone or computer) for providing one or more aspects of surface performance testing, e.g., obtaining configuration information, performing test configuration, configuring and/or generating graphical representations (e.g., heatmaps, bar graphs, pie charts, interactive charts, and/or interactive graphs) or related test output, and/or other functions. For example, SPTA 2414 may be configured for defining and/or configuring surfaces for testing, defining and/or configuring devices usable for testing, defining and/or configuring test runs (e.g., test sessions with user defined parameters or variables including particular test locations on the test surface), and/or viewing and/or analyzing current and/or archived test data (e.g., surface performance test information) or related output (e.g., graphical or visual representations).

In some embodiments, SPTA 2414 and/or a related user interface may be used to generate graphical representations (e.g., heatmaps) for various test devices on the market and various surface performance related variables can be selected or inputted for testing. In some embodiments, SPTA

2414 may be automatically configured to use one or more surface performance testing apparatus(es) 2404 for test runs and/or may generate a heatmap and/or other graphical representation based on a user defined surface location.

In some embodiments, device 2402 and/or related entities (e.g., SPTA 2414) may include or utilize one or more communications interfaces for receiving and/or sending data. For example, device 2402 and/or SPTA 2414 may utilize a wireless communications interface (e.g., a Wi-Fi or radio interface) to interact with apparatus(es) 2404 or related entities to obtain surface performance test information (e.g., collected surface performance data, interaction information, and/or footwear or test instrument related data). In another example, device 2402 and/or SPTA 2414 may utilize a wired communications interface (e.g., an Ethernet or other wired interface) to interact with apparatus(es) 2404 or related entities to obtain surface performance test information. In some example, device 2402 and/or SPTA 2414 may use wired or wireless communications interfaces to send or store graphical representation(s) of surface performance test information to one or more entities (e.g., a web-based GUI, a display device, a storage device or related system, etc.).

In some embodiments, SPTA 2414 may store configuration information or other data may in cloud based storage, where the data is accessible to people with administrative privileges and/or assigned relevant permissions.

It will be appreciated that FIG. 24 is for illustrative purposes and that various nodes, their locations, and/or their functions may be changed, altered, added, or removed. For example, some nodes and/or functions may be combined into a single entity. In a second example, a node and/or function may be located at or implemented by two or more nodes.

Figure 25:
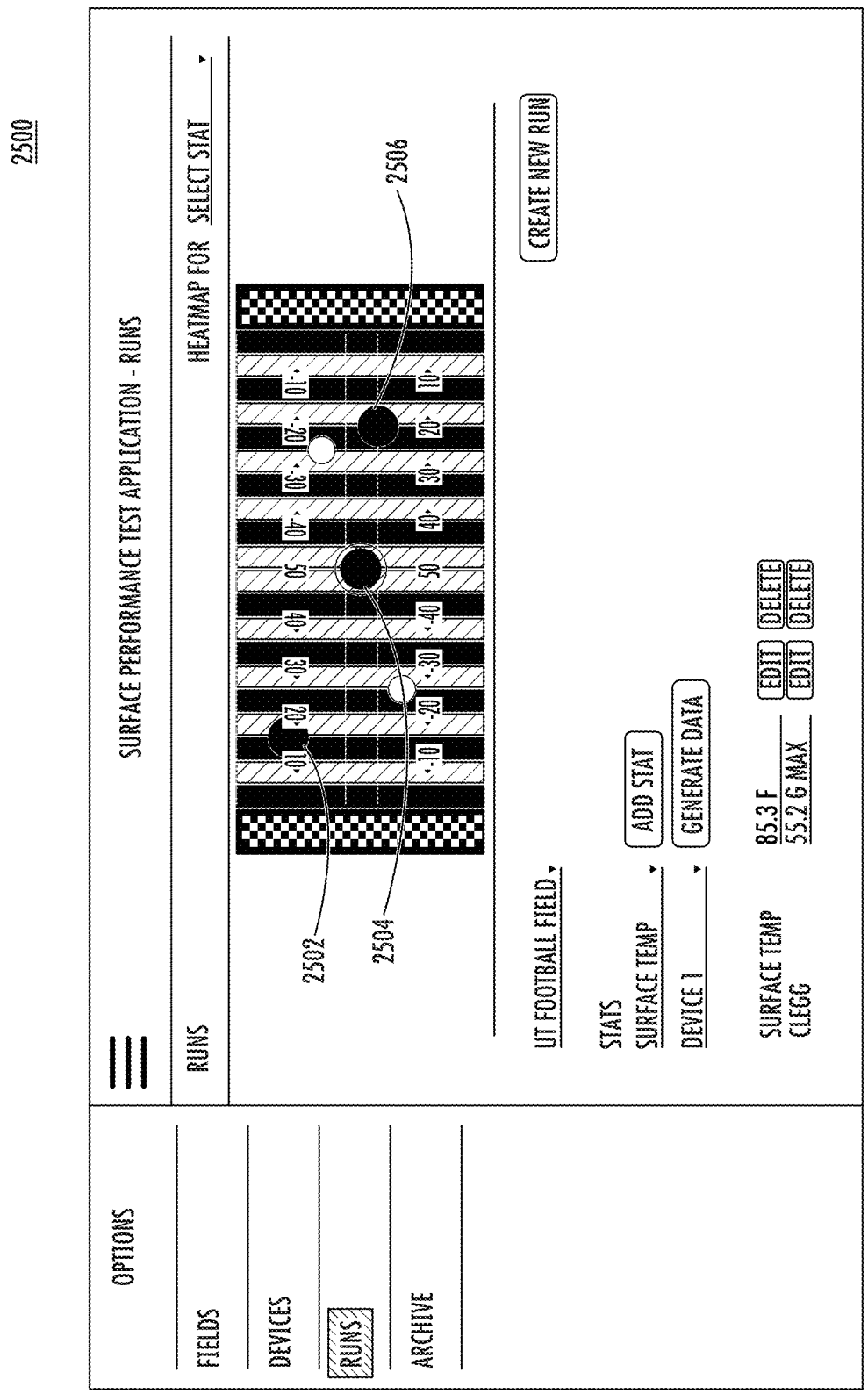
FIG. 25 is a diagram illustrating an example user interface for configuring a test run.

FIG. 25 is a diagram illustrating an example user interface 2500 for configuring a test run. For example, user interface 2500 may represent a graphical user interface (GUI) provided by SPTA 2414 for obtaining user input and/or for modifying configuration information usable when configuring a test run or scenario associated with one or more user defined or selected parameters. In this example, user interface 2500 may provide user interface elements (e.g., drop-down boxes, buttons, input boxes, interactive image(s), etc.) for inputting (e.g., selecting, typing, modifying, etc.) configuration information associated with surface performance testing and/or generating related graphical representation(s) (e.g., a heatmap, a bar graph, a pie chart, an interactive graph, or an interactive chart). In some embodiments, configuration information may be imported directly into test system 2400 (or elements thereof) from a data storage or may be inputted or modified by a user, e.g., via user interface 2500.

Referring to FIG. 25, user interface 2500 may have an options menu for displaying different pages usable for configuration. Example pages may include pages for fields, devices, runs, and archive. In some embodiments, a fields page may be usable for defining or configuring one or more fields for testing. Example field parameters that may be defined or configured for a particular field may include a name (e.g., "New College Track"), a shape (e.g., elliptical), a length (e.g., 125 meters), a width (e.g., 85 meters), a surface type (e.g., synthetic rubber), an image for representing the surface, and/or an origin parameter comprising an latitude and an longitude indicating a geographical location of the surface.

In some embodiments, a devices page may be usable for defining or configuring one or more test devices usable for performing aspects of surface performance testing. Example device information that may be defined or configured for a particular test device may include various device details, e.g., a name, a model number, a last calibration date, and various device specific data, e.g., spring constants, foot radius, shoe size, theta, and/or alpha.

In some embodiments, a run page may be usable for defining or configuring one or more test runs. Example test run parameters that may be defined or configured for a particular test run may include graphical representation related statistics (e.g., which statistics will be displayed in a graphical representation), graphical representation settings (e.g., colors to use for particular statistics or other ranges of statistics), a test surface, test location(s), test device(s), and/or other settings. For example, as depicted in FIG. 25, a runs page allows selecting a surface performance related statistic (e.g., surface hardness) to display via a heatmap, for selecting a test surface, for selecting particular test locations 2502-2506, for selecting one or more test device(s), for obtaining data from the test device(s), and/or for displaying test related data as one or more heatmap(s) or other graphical representation(s).

In some embodiments, a run page or another page of user interface 2500 to manually select one or more test locations (e.g., by using a mouse or keyboard to move a visual boundary or shape over an image representing the test surface). For example, instead of or in lieu of selecting predetermined spots of a test surface, a user can interactively and/or visually select test locations (e.g., test locations 2502-2506) where surface performance test will be performed by moving a circle or dot to a corresponding location of a visual representation of the surface and/or by adjusting or changing a size of circle or dot to indicate a test location size.

In some embodiments, test device variables or statistics that can be inputted may include soil moisture, surface hardness, head impact criteria, vertical deformation, energy restitution, force reduction, rotational traction, linear traction, infill depth, grass percentage, plant count, and surface temperature.

In some embodiments, a run page or another page of user interface 2500 may allow a user to customize a color scheme of user interface 2500 and/or SPTA 2414.

In some embodiments, a run page or another page of user interface 2500 may allow a user to customize or define the colors used by one or more a generated graphical representation(s) associated with collected or obtained surface performance test information (e.g., information indicating surface performance related to one or more test variables, information indicating test instrument performance related to one or more test variables (e.g., a footwear's durability or wear effects), and/or information indicating effects footwear or other instruments have on the test surface (e.g., surface related interaction information). For example, if a user is red-green color blind, a user may be able to select a graphical representation(s) (e.g., a heatmap, a bar graph, a pie chart, an interactive graph, or an interactive chart) to color-code using blue and orange.

In some embodiments, an archive page may be usable for viewing or analyzing historical test runs or related data. For example, an archive page may include an interactive listing showing prior test runs associated with a user. In this example, after selecting a particular test run, the archive page may display test run related parameters and/or associated test output, e.g., one or more graphical representation(s).

It will be appreciated that FIG. 25 is for illustrative purposes and that various aspects described above in relation to FIG. 25 may be changed, altered, added, or removed. For example, some user interface elements and/or features described in FIG. 25 may be removed or modified.

Figure 26:
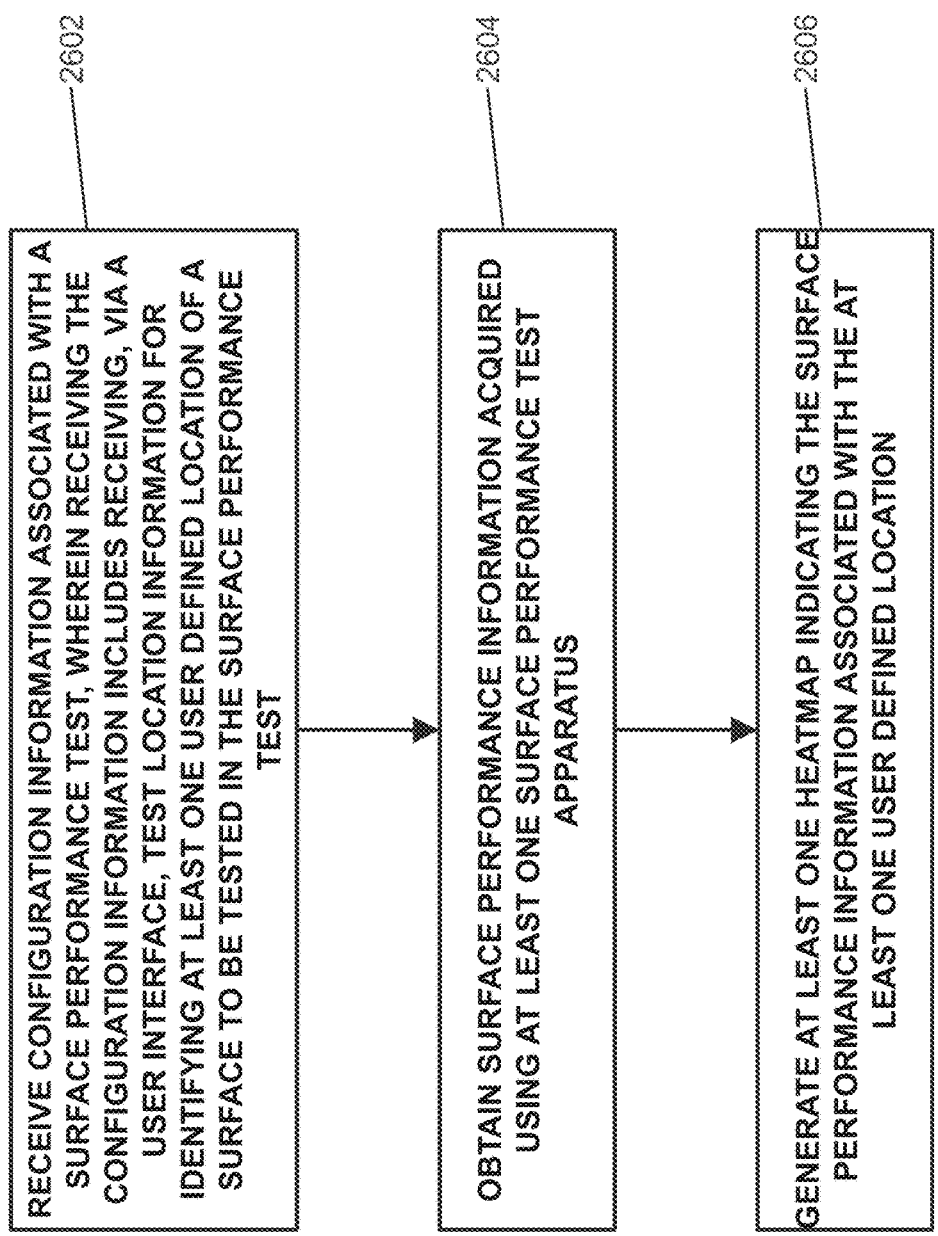
FIG. 26 is a diagram illustrating an example process for generating graphical representation(s) associated with surface performance test information.

FIG. 26 is a diagram illustrating an example process 2600 for generating graphical representation(s) associated with surface performance test information. In some embodiments, example process 2600, or portions thereof, may be performed by or at test system 2400, computing device 2402, SPTA 2414, and/or another node or module.

In step 2602, configuration information associated with a surface performance test may be received. In some embodiments, receiving configuration information includes receiving, via a user interface, test location information for identifying at least one user defined location of a surface to be tested in the surface performance test.

In some embodiments, receiving test location information may involve a user indicating multiple user defined locations by interacting with a visual representation of the surface via a GUI, e.g., user interface 2500. For example, a user can select various areas on an image of a football field by using a mouse or by entering latitude and longitude values or relative coordinates, e.g., based on an alphanumerical grid overlayed on the football field image.

In some embodiments, configuration information may include color information for indicating one or more colors or shades of a color to use when generating the at least one graphical representation. For example, a generated heatmap may use a user defined system of color-coding (e.g., shades of blue and yellow, shades of red and green, etc.) to represent different values associated with a surface performance test variable.

In step 2604, surface performance test information acquired using at least one surface performance test apparatus may be obtained. In some embodiments, surface performance test information may include information about soil moisture, surface hardness, head impact criteria, vertical deformation, energy restitution, force reduction, rotational traction, linear traction, infill depth, grass percentage, plant count, and/or surface temperature. For example, a user can select (e.g., via user interface 2500) a number of test variables for surface performance testing apparatus(es) 2404 to identify, measure, or test.

In step 2606, at least one graphical representation indicating the surface performance test information associated with the at least one user defined location may be generated. For example, a graphical representation (e.g., a heatmap) may be generated to visually depict surface performance metric(s) (e.g., surface hardness, force reduction, rotational traction, etc.) associated with various portions of a surface. In this example, predefined or user selected colors (or shades thereof) may represent different values or ranges of values.

In some embodiments, a graphical representation indicating surface performance test information may include a heatmap, a bar graph, a pie chart, an interactive graph, or an interactive chart. For example, computing device 2402 and/or SPTA 2414 may use collected surface performance test information to generate an interactive heatmap or graph. In this example, the user may be able to manipulate the chart in real-time or near real-time to show and/or filter data related to one or more user-selectable test variables.

In some embodiments, surface performance test information obtained from surface performance test apparatus(es) and/or graphically represented may include surface related interaction data, e.g., information about interactions between footwear and a surface or information about interactions between at least one surface performance test apparatus and the surface.

It will be appreciated that process shown in FIG. 26 is for illustrative purposes and that different and/or additional actions may be used. It will also be appreciated that various actions described herein may occur in a different order or sequence.

One skilled in the art will readily appreciate that the present disclosure is well adapted to carry out various aspects and advantages mentioned, as well as those inherent therein. The present disclosure described herein are presently representative of various embodiments, are examples, and are not intended as limitations on the scope of the present disclosure. Changes therein and other uses will occur to those skilled in the art which are encompassed within the spirit of the present disclosure as defined by the scope of the claims.

It should be noted that test system 2400, computing device 2402, SPTA 2414, and/or functionality described herein may constitute a special purpose computing device. Further, test system 2400, computing device 2402, SPTA 2414, and/or functionality described herein can improve the technological field of surface performance testing and/or related analysis by providing user customizations for performing surface performance testing involving one or more surface performance test apparatuses and/or for facilitating user customizable graphical representations (e.g., heatmaps or bar charts) for indicating surface performance test information associated with surface performance testing. For example, test system 2400, computing device 2402, SPTA 2414, and/or functionality described herein can be used to indicate multiple user defined test locations by interacting with a visual representation of the surface and to use data obtain from the user defined test locations (e.g., acquired via one or more surface performance test apparatuses) to generate a heatmap or other graphical representation depicting collected data associated with one or more surface performance test variables, e.g., surface temperature and energy restitution.

Also provided herein are methods of testing surface. Such methods comprise providing a surface performance testing apparatus and/or system as disclosed herein, applying the apparatus and/or system to a surface to be tested, and actuating the actuator to cause the shoe to contact the surface to be tested. One or more forces generated during at least a portion of the shoe's contact with the surface can be measured. The methods can the comprise evaluating the measurements taken and calculating traction of acceleration, traction of deceleration and/or traction during cutting. In some embodiments, such methods can further comprise determining the playability and/or performance of a tested surface. In some embodiments, the methods can also comprise adjusting the angle and/or orientation of the shoe prior to actuating the actuator of the apparatus and/or system. Likewise, the mechanical force of the actuator prior to actuation can be adjusted, and/or a desired actuator strength can be selected prior to actuation of the apparatus and/or system.

As disclosed herein, such methods can be performed on any surface where testing is desired, including for example, but not limited to, any surface, natural or synthetic, used for sports or recreation, optionally an artificial turf surface, a natural turf surface, natural and synthetic equestrian performance surfaces, a track surface, a wooden court surface, a synthetic court surface, a clay court, a rolled clay surface, and/or hybrid surfaces. Other surfaces to be tested can include equestrian, dog or other animal performance surfaces, including but not limited to horse race tracks, equestrian performance surfaces, e.g. show rings, and dog race tracks. Other surfaces to be tested can include various terrains and natural land surfaces, including for example desert sand, mountain terrain, etc., where shoes, boots and other footwear may need testing for applications such as military, law enforcement, search and rescue, and the like. In some embodiments, the surface to be tested comprises a floor or work surface, wherein such methods further comprise determining an occupational safety parameter of the floor or work surface, e.g. a concrete surface or floor, a wood floor, a tile floor, a factory floor, a warehouse floor, a floor in a store, etc. By evaluating a surface, e.g. a floor or work surface, using the disclosed devices and methods data can be acquired to then be used for modeling occupational safety and health factors, e.g. muscle fatigue, associated with the surface or flooring.

In some embodiments, in the disclosed methods the actuator can be actuated a plurality of times across a plurality of locations on the surface to be tested, wherein measurements of the surface are collected from the plurality of locations on the surface. The plurality of locations on the surface from which the measurements of the surface are collected can in some embodiments be arranged in a grid pattern, wherein the measurements from the grid pattern can be collected and processed in real-time to create a mapped output of the collected measurements. Such a method or process can allow for the assessment or determination of the variability of surface characteristics across a defined region or area of a field, floor, etc. By using a grid system the area to be assess can be systematically evaluated and the data processed to create a surface map or heat map illustrating the variability of the measure parameters.

EXAMPLES

The following examples are included to further illustrate various embodiments of the presently disclosed subject matter. However, those of ordinary skill in the art should, in light of the present disclosure, appreciate that many changes can be made in the specific embodiments which are disclosed and still obtain a like or similar result without departing from the spirit and scope of the presently disclosed subject matter.

Example 1

Testing Surface Performance Characteristics Using the Disclosed Testing Apparatus Professional football players play on a variety of different surfaces. Each surface has unique characteristics that impacts athletes. A study was completed looking at a 200 lb. athlete on three different surfaces with the same cleat (Nike Vapor 360 was used in this instance, although any type of shoe desired to be tested could be used) to determine performance traction characteristics of the surfaces. The three most common surfaces found in the National Football League (NFL) were selected for this study. A Kentucky bluegrass plot with a sand rootzone, a bermudagrass plot with a sand root zone, and a synthetic field using a 2.25 inch pile weight with a sand and rubber mix rootzone were investigated for differences in acceleration and deceleration potential for athletes. Each surface was managed consistent with how an NFL team would maintain each surface.

During the experimentation, each surface had five replications of each test performed. Each foot strike was completed on a new location within the surface and not in the same location over time. When testing a 200 lb. athlete it was completed at two times the body weight to properly simulate the forces generated when an athlete makes the athletic movement.

The disclosed surface performance testing apparatus was set to retract the cart with the foot attached until two times the weight of a 200 lb. athlete was acting on the cart. As the cart reached the desired length of retraction it was released and the impact of the cleat on the surface was measured. The traction of the surface was measured in the length and time of travel of the cleat upon contact with the surface, the horizontal force felt on the foot and the vertical force experienced on the metatarsal phalangeal join (MTP). The foot was turned in two different orientations to achieve acceleration and deceleration testing conditions. The acceleration condition includes facing the rear of the device to orient the foot that applies force in a way that would be an athlete accelerating off the surface. While the deceleration condition includes orienting so the foot is facing toward the opposite end of the testing apparatus as the acceleration condition. The results of each test were averaged and analysis of variance was conducted on the means. From the analysis the graphs in FIGS. 18A-18D and 19A-19C were generated showing the differences in the surfaces.

Figure 18A:
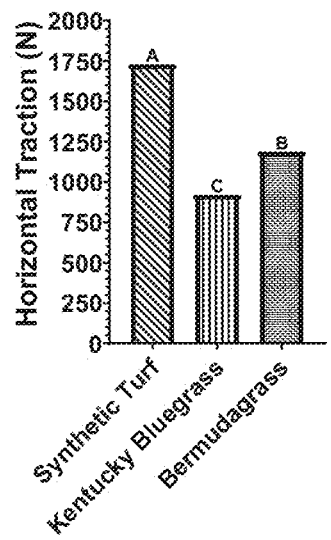
FIGS. 18A-18D are graphical depictions of data collected from measuring various parameters on three different playing surfaces during an accelerating motion, where the three different playing surfaces included synthetic turf, Kentucky bluegrass and bermudagrass.
Figure 18B:
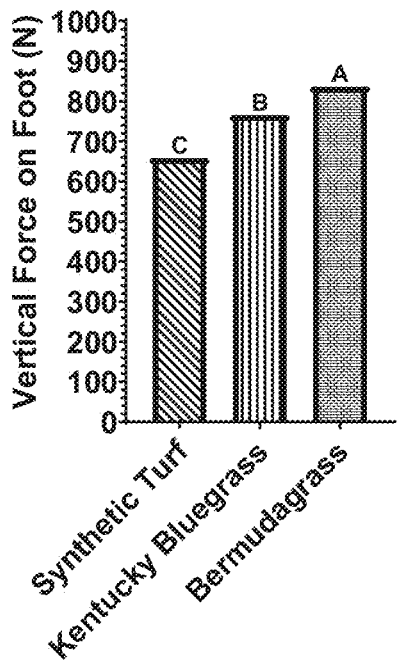
Figure 18C:
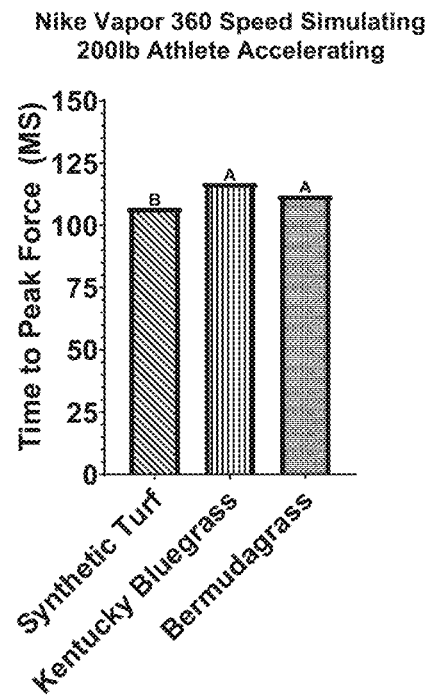
Figure 18D:
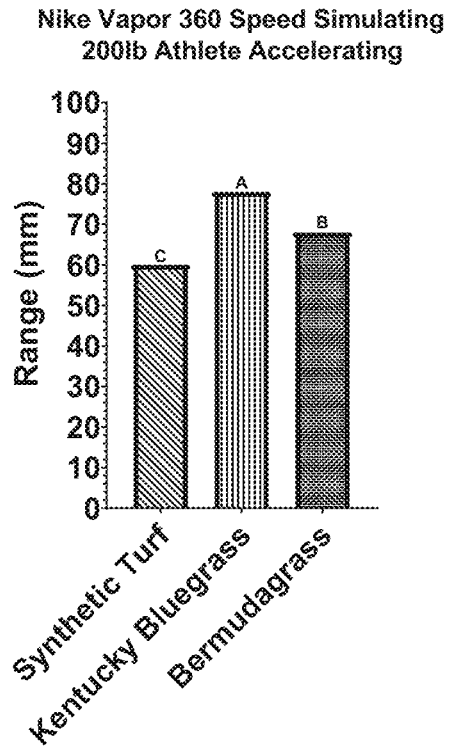

More particularly, FIGS. 18A-18D show the results of measuring various parameters on three different playing surfaces during an accelerating motion, where the three different playing surfaces included synthetic turf, Kentucky bluegrass and bermudagrass. FIG. 18A shows the results of measuring horizontal traction (N) on the three different playing surfaces during an accelerating motion. Likewise, FIGS. 18B through 18D show the results of measuring vertical force on foot (N), time to peak force (MS) and range (mm), respectively, on the three different playing surfaces during an accelerating motion.

Horizontal traction (FIG. 18A) is equated to the force experienced horizontally across the surface. The higher force indicates the ability to generate greater forces and potentially run faster on a surface, whereas the lower forces indicate that potentially an athlete could be slower across the surface.

Vertical force on foot (FIG. 18B) is the measured force of the ground on the foot. This can indicate the hardness of the surface, which is a factor in the potential for an athlete to accelerate faster on a firmer surface. Too high numbers can lead to poor traction (for example concrete) while to low can lead to slippage (for example mud).

Time to peak force (FIG. 18C) can be defined as the time for the cleat (or other footwear) to reach the maximum force experienced on the athlete. If such time is too short it can indicate greater force experienced by athlete, and/or that the surface is too firm. If such time is too long it can indicate a poor traction surface.

Acceleration range (FIG. 18D) is defined as the movement of the cleat (or other footwear/component to be tested) upon contact with the surface. This indicates how quickly an athlete could achieve maximum traction. That is, a lower number can be interpreted to indicate a faster surface, while a higher number can indicate a slower surface.

Figure 19A:
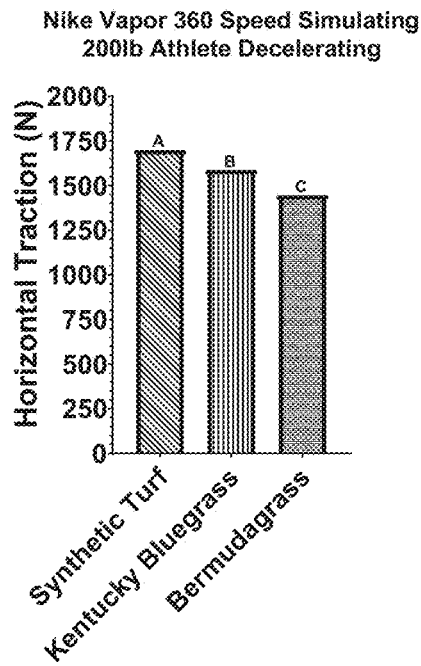
FIGS. 19A-19C are graphical depictions of data collected from measuring various parameters on three different playing surfaces during a decelerating motion, where the three different playing surfaces included synthetic turf, Kentucky bluegrass and bermudagrass.
Figure 19B:
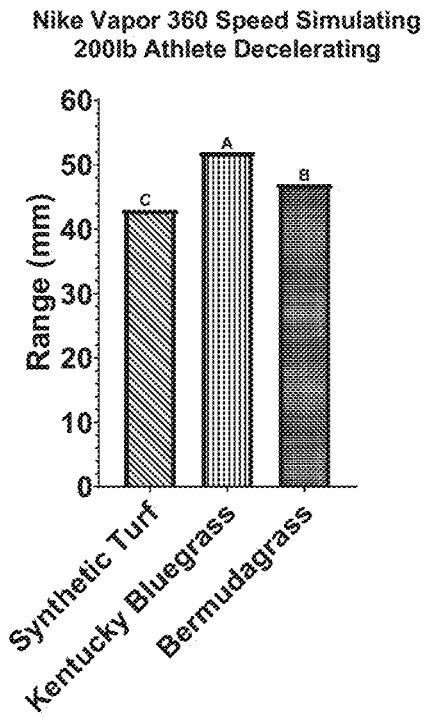
Figure 19C:
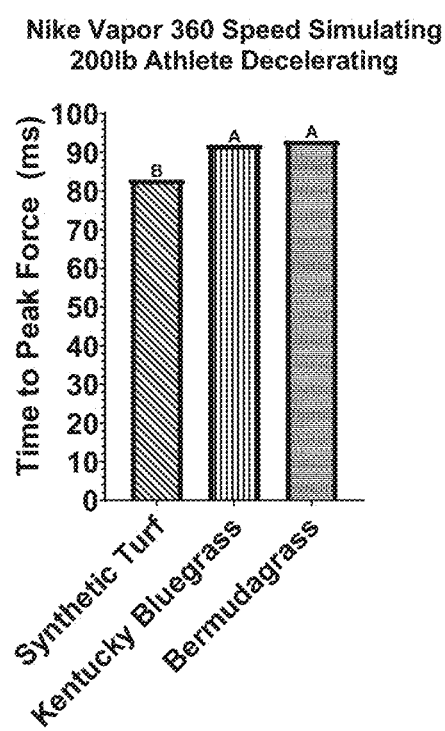

FIGS. 19A-19C show the results of measuring various parameters on three different playing surfaces during a decelerating motion, where the three different playing surfaces included synthetic turf, Kentucky bluegrass and bermudagrass. FIG. 19A shows the results of measuring horizontal traction (N) on the three different playing surfaces during a decelerating motion. Likewise, FIGS. 19B through 19C show the results of range (mm) and time to peak force (MS), respectively, on the three different playing surfaces during an accelerating motion.

Example 2

Evaluating the Variability of Field Surface Performance Characteristics Across a Playing Surface Using the Disclosed Testing Apparatus While testing a surface and getting a mean can be very valuable, the ability to conduct multiple tests to determine the variability of the surface across a large section, i.e. part or the entirety of a playing surface, can help improve the safety and performance of an athletic field. Studies were conducting using the testing apparatus to evaluate the variability of a playing surface across its entire surface area.

A full-sized college football field was tested within the boundary lines. There were 45 different testing locations completed on the surface, and then heat maps were generated. FIGS. 20A-20D are representative images of heat maps generated from these studies.

The heat maps utilize weighted averages to determine what the findings would be between locations tested. The computer software R was used for the analysis to create the maps. For each of the different variables for the acceleration condition a heat map was generated.

The heat maps help to identify the variability of each surface. For example, the heat maps can help field managers quickly identify areas of concern that are in need maintenance to improve the surface for an athlete. The greater the difference in areas of the field can indicate the greater the variability of the surface and the greater the potential for injury of an athlete. The heat maps successfully showed the variation with the disclosed testing apparatus across a field.

For the present studies, a 180 lb athlete at two times the body weight was selected as that is the average weight of a wide receiver playing football in the Southeastern Conference. The same cleat was used across the surface to ensure that the differences observed are due to the field surface and not the cleat. The disclosed testing apparatus was released once at each of the 45 locations across the field. The testing apparatus was set to retract the cart with the foot attached until two times the weight of a 180 lb. athlete was acting on the cart. As the cart reached the desired length of retraction it was released and the impact of the cleat on the surface was measured. The traction of the surface was measured in the length and time of travel of the cleat upon contact with the surface, the horizontal force felt on the foot and the vertical force experienced on the metatarsal phalangeal join (MTP).

Figure 20A:
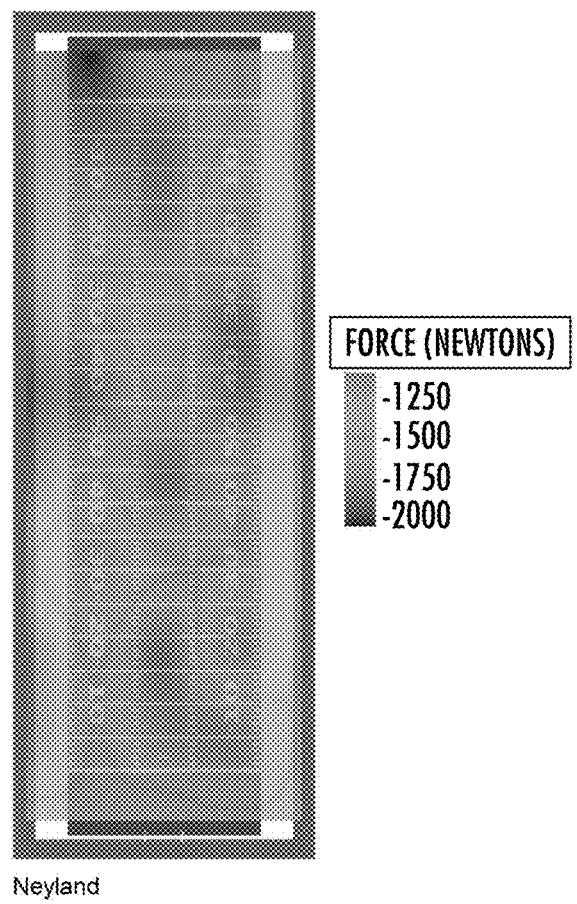
FIGS. 20A-20D heat maps generated from data collected using the disclosed testing apparatus based on variability of various surface parameters across the surface of a playing field.
Figure 20B:
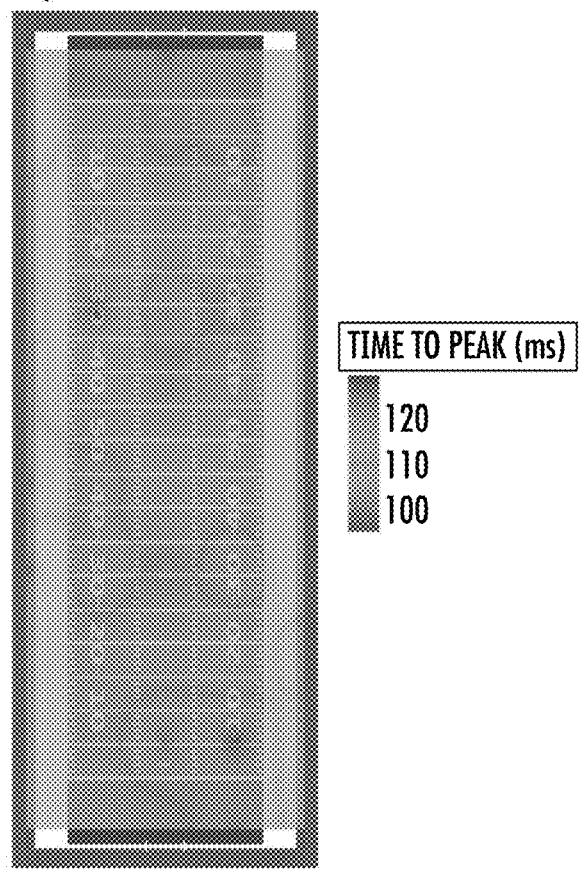
Figure 20C:
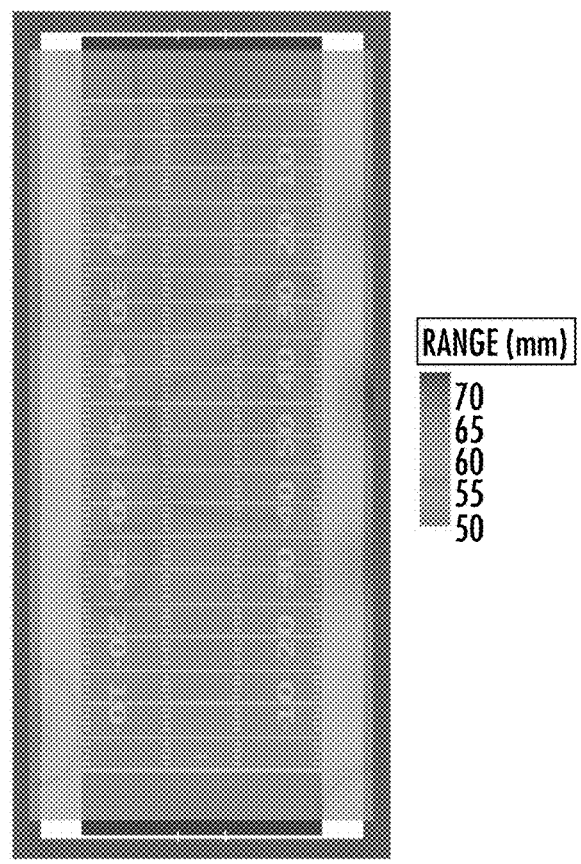
Figure 20D:
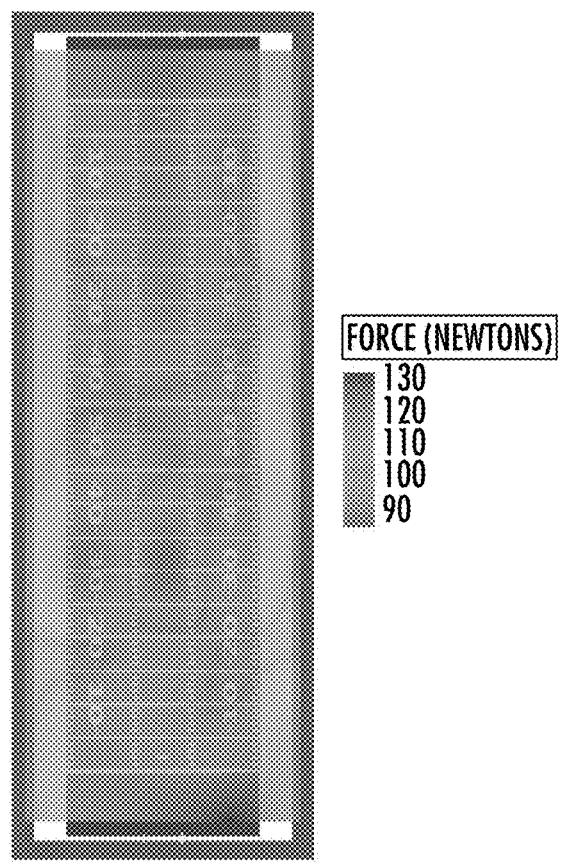

The heat maps shown in FIGS. 20A-20D show variability across the surface of the field for each of the following parameters: acceleration horizontal/ankle force in Newtons (N; FIG. 20A); acceleration time to peak force in milliseconds (ms; FIG. 20B); acceleration range in millimeters (mm; FIG. 20C); and acceleration force on toe in Newtons (N; FIG. 20D).

To elaborate, FIG. 20A is a heat map of the measured force experienced at the ankle horizontally across the testing points over the entire field. The higher force indicates the ability to generate greater forces and potentially run faster on a surface, whereas the lower forces indicate that potentially an athlete could be slower across the surface.

FIG. 20B is a heat map of the measured acceleration time to peak force across the testing points over the entire field. The time to peak force, including acceleration time to peak force, can be defined as the time for the cleat (or other footwear) to reach the maximum force experienced on the athlete. If such time is too short it can indicate greater force experienced by athlete, and/or that the surface is too firm. If such time is too long or too short it can indicate a poor traction surface. The ability to measure variations and differences in the time to peak force across a surface using the disclosed apparatuses affords the ability to gather such important data to determine optimal surface characteristics that provide sufficient traction without being too firm.

FIG. 20C is a heat map of the measured acceleration range across the testing points over the entire field. The measured acceleration range is defined as the movement of the cleat (or other footwear/component to be tested) upon contact with the surface. This indicates how quickly an athlete could achieve maximum traction. That is, a lower number can be interpreted to indicate a faster surface, while a higher number can indicate a slower surface.

FIG. 20D is a heat map of the measured acceleration force on the toe acquired across the testing points over the entire field. The measured acceleration force on the toe can be equated to the force of the ground on the toe. This can indicate the hardness of the surface, which is a factor in the potential for an athlete to accelerate faster on a firmer surface. Too high numbers can lead to poor traction (for example concrete) while to low can lead to slippage (for example mud).

Example 3

Testing Traction Performance of Cleats on Four Surfaces at Ten Different Weights Professional athletes have a variety of cleats to choose from that they can use during play. This study investigated the differences in a newer generation cleat of the same model. The cleats in this study were the Nike Vapor Jet (older model) and the Nike Speed 360 (newer model). Each cleat has a different cleat plate (configuration of studs) that would impact the traction the shoe would experience on a surface. To fully understand the traction capabilities of each shoe, it was tested on four different surfaces utilized in the National Football League (NFL). In addition, knowing that all athletes are not the same weight nine different weights were investigated to determine how the weight of the athlete would impact cleat performance. The weights of the athletes simulated athletes from 100 pounds to 325 pounds in increments of 25 pounds each. All data was collected on the same day to reduce variability in the surface and conditions. This test was completed with five replications for each plot at each weight, surface, and shoe.

Figure 22A:
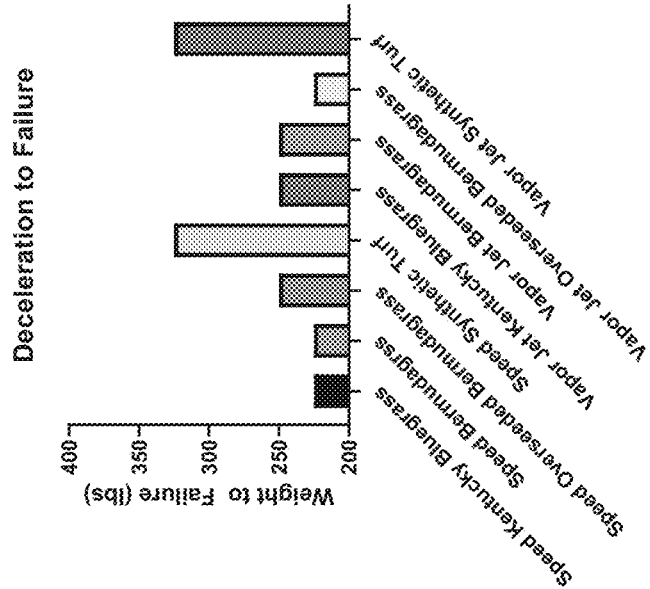
FIGS. 22A and 22B are graphical depictions of data collected from measuring various parameters on three different playing surfaces during an accelerating motion, where the three different playing surfaces included synthetic turf, Kentucky bluegrass and bermudagrass.
Figure 22B:
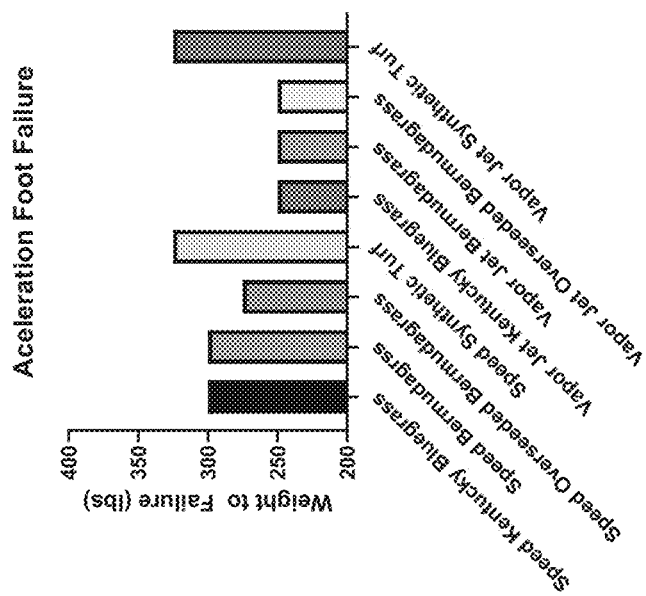

The results are shown in FIGS. 22A and 22B. The weight applied where failure of the cleat to sustain traction occurs in both in the acceleration (FIG. 22A) and deceleration (FIG. 22B) conditions on traction. The shoes used where the Nike Vapor Jet and the Nike Vapor 360 Speed.

The data depicted in FIGS. 22A-22B demonstrate the weight that each cleat would break traction and no longer hold on the surfaces tested if they would break at all. The results indicated that the synthetic turf regardless of shoe never had a breaking point for the traction of the surface. Not having a weight that both shoes lost traction on synthetic turf could indicate help explain why injuries overall have seen to be higher in synthetic turf in the NFL (Mack, 2019). The ability of the synthetic surface to hold would indicate that a different stud pattern, particularly shorter studs with smaller diameters could release on the surface is needed. The Kentucky bluegrass and the bermudagrass both had a similar breaking point for the grasses when using the same model cleat. However, there were different breaking points between the new and old model of cleats tested on the natural grass surfaces. These results indicate that cleats with different cleat plates generate different traction values on a given surface. The disclosed devices and apparatuses will allow for studies to examine which stud configuration or cleat models would lose traction on synthetic turf like natural grass. These findings suggest that knowing how a cleats traction values vary on a surface would change athlete performance.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A surface performance testing apparatus, the apparatus comprising:
    a cart slidably affixed to a rail;
    an actuator linked to the cart; and
    a footform affixed to the cart, wherein the footform is configured to mimic a human foot, animal hoof or animal foot,
    wherein the cart, rail and actuator are arranged to move the cart and attached footform at an angle relative to a substantially horizontal surface to be tested, whereby the footform contacts the surface to be tested at a selected contact angle, wherein the cart, rail and actuator are arranged within a housing, wherein an angle or position of the housing is adjustable relative to the substantially horizontal surface to be tested by way of one or more adjustable elements threadingly engaged to the housing.

2. The surface performance testing apparatus of claim 1, further comprising a shoe, horseshoe or other footwear affixed to the footform.

3. The surface performance testing apparatus of claim 1, wherein the apparatus is configured to test any footwear, shoe, athletic cleat or boot against a surface.

4. The surface performance testing apparatus of claim 1, wherein the apparatus is configured to test a human foot, animal foot or animal hoof against a surface.

5. The surface performance testing apparatus of claim 3 or 4, wherein the surface comprises a natural or synthetic surface selected from the group consisting of an artificial turf surface, a natural turf surface, natural and synthetic equestrian performance surfaces, a track surface, a wooden court surface, a synthetic court surface, a clay court surface, a rolled clay court surface, a hybrid surface, a natural land surface, a floor, and/or a work surface.

6. The surface performance testing apparatus of claim 1, further comprising a three degree of freedom sensor or three component force sensor.

7. The surface performance testing apparatus of claim 1, further comprising one or more wheels for transportability.

8. The surface performance testing apparatus of claim 1, further comprising a standing platform.

9. A method of testing the footform or footwear, the method comprising:
    providing a surface performance testing apparatus of claim 8;
    applying the apparatus to a surface against which the footform or footwear is to be tested; and
    actuating the actuator to cause the footform or footwear to contact the surface to be tested.

10. The method of claim 9, wherein the footwear comprises a shoe, athletic cleat, horseshoe, or boot affixed to the footform and for which testing against a surface is selected.

11. The method of claim 9, wherein the footform mimics a human foot, animal foot or animal hoof for which testing against a surface is selected.

12. The method of claim 9, further comprising measuring one or more forces generated during at least a portion of the contact between the foot footform or footwear and the surface.

13. The method of claim 12, further comprising obtaining surface performance test information acquired from the measurement of the one or more forces generated.

14. The method of claim 9, wherein the footform mimics a horse hoof and the surface comprises a track or equestrian riding surface.

* * * * *